United States Patent
Natarajan et al.

(10) Patent No.: US 10,531,605 B2
(45) Date of Patent: Jan. 14, 2020

(54) SEED FIRMER AND PLANTING MACHINE

(71) Applicant: Deere & Company, Moline, IL (US)

(72) Inventors: Kamalakannan Natarajan, Maharashtra (IN); Dnyanesh Dhobale, Maharashtra (IN); Elijah B. Garner, Bettendorf, IA (US); Cary Hubner, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 118 days.

(21) Appl. No.: 15/854,271

(22) Filed: Dec. 26, 2017

(65) Prior Publication Data

US 2018/0160615 A1    Jun. 14, 2018

Related U.S. Application Data

(63) Continuation of application No. 15/232,498, filed on Aug. 9, 2016, now Pat. No. 9,848,527, which is a continuation-in-part of application No. 14/871,222, filed on Sep. 30, 2015, now Pat. No. 9,839,178.

(51) Int. Cl.
*A01C 5/06* (2006.01)
*A01C 7/20* (2006.01)
*A01B 61/04* (2006.01)

(52) U.S. Cl.
CPC ............ *A01C 5/068* (2013.01); *A01B 61/046* (2013.01); *A01C 7/205* (2013.01)

(58) Field of Classification Search
CPC .................................. A01C 5/068; A01C 7/205
See application file for complete search history.

(56) References Cited

U.S. PATENT DOCUMENTS

| | | | |
|---|---|---|---|
| 3,157,139 A | 11/1964 | Spindler | |
| 3,598,069 A | 8/1971 | Hatcher | |
| 4,141,302 A * | 2/1979 | Morrison, Jr. | ........... A01C 5/06 111/140 |
| 4,208,974 A | 6/1980 | Dreyer et al. | |

(Continued)

FOREIGN PATENT DOCUMENTS

| | | |
|---|---|---|
| CA | 1112110 | 11/1981 |
| EP | 1529432 | 5/2005 |

(Continued)

OTHER PUBLICATIONS

Expata Solutions, Inc., "Mojo Wire," article, publicly available prior to Sep. 30, 2015, (2 pages) http://www.exapta.com/products/mojo_wires.html.

(Continued)

*Primary Examiner* — Alicia Torres
(74) *Attorney, Agent, or Firm* — Michael Best & Friedrich LLP

(57) ABSTRACT

A seed firmer includes an attachment bracket having a portion provided for attachment to a row unit of a planting machine. A non-compliant arm is provided with a ground-facing surface for engagement with the soil during planting. The seed firmer includes a mount through which the non-compliant arm is connected to the attachment bracket. The mount is a compliant mount operable to deflect and exert an elastic bias force during operation, without deflection of the non-compliant arm.

15 Claims, 15 Drawing Sheets

(56) References Cited

U.S. PATENT DOCUMENTS

| | | | |
|---|---|---|---|
| 4,714,033 A * | 12/1987 | Neumeyer | A01C 5/068 111/156 |
| 5,092,255 A | 3/1992 | Long et al. | |
| 5,341,754 A | 8/1994 | Winterton | |
| 5,425,318 A | 6/1995 | Keeton | |
| 5,461,995 A | 10/1995 | Winterton | |
| 5,562,054 A * | 10/1996 | Ryan | A01C 7/203 111/134 |
| 5,852,982 A | 12/1998 | Peter | |
| 6,082,274 A | 7/2000 | Peter | |
| 6,119,608 A | 9/2000 | Peterson et al. | |
| 6,530,334 B2 | 3/2003 | Hagny | |
| 6,666,156 B1 | 12/2003 | Mayerle et al. | |
| 7,497,174 B2 | 3/2009 | Sauder et al. | |
| 7,644,670 B2 | 1/2010 | Martin | |
| 7,707,952 B2 | 5/2010 | Schaffert | |
| 8,672,047 B2 | 3/2014 | Schilling | |
| 8,746,159 B2 | 6/2014 | Garner et al. | |
| 9,137,941 B2 | 9/2015 | Stark | |
| 9,155,244 B2 | 10/2015 | Schaffert | |
| 9,402,341 B1 | 8/2016 | Wipf | |
| 2002/0174813 A1 | 11/2002 | Hagny | |
| 2008/0184920 A1 | 8/2008 | Thompson et al. | |
| 2012/0168186 A1 | 7/2012 | Kile | |
| 2015/0250094 A1 | 9/2015 | Hodel et al. | |
| 2016/0008964 A1 | 1/2016 | Peter | |
| 2016/0262304 A1 | 9/2016 | Hagny et al. | |

FOREIGN PATENT DOCUMENTS

| | | |
|---|---|---|
| WO | WO 2014066650 | 5/2014 |
| WO | WO 2014066664 | 5/2014 |
| WO | WO 2015031840 | 3/2015 |
| WO | WO 2016166727 | 10/2016 |

OTHER PUBLICATIONS

EP16191114.4 Extended European Search Report dated Mar. 24, 2017 (7 pages).
EP16191120.1 Extended European Search Report dated Mar. 24, 2017 (7 pages).

* cited by examiner

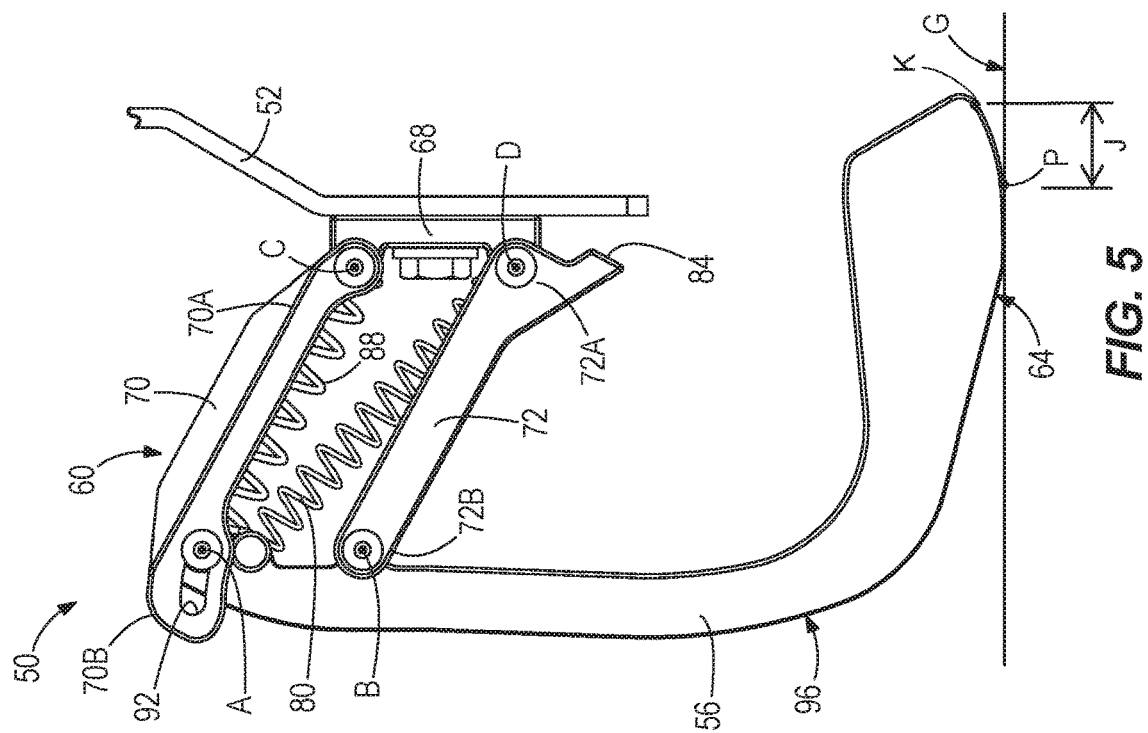
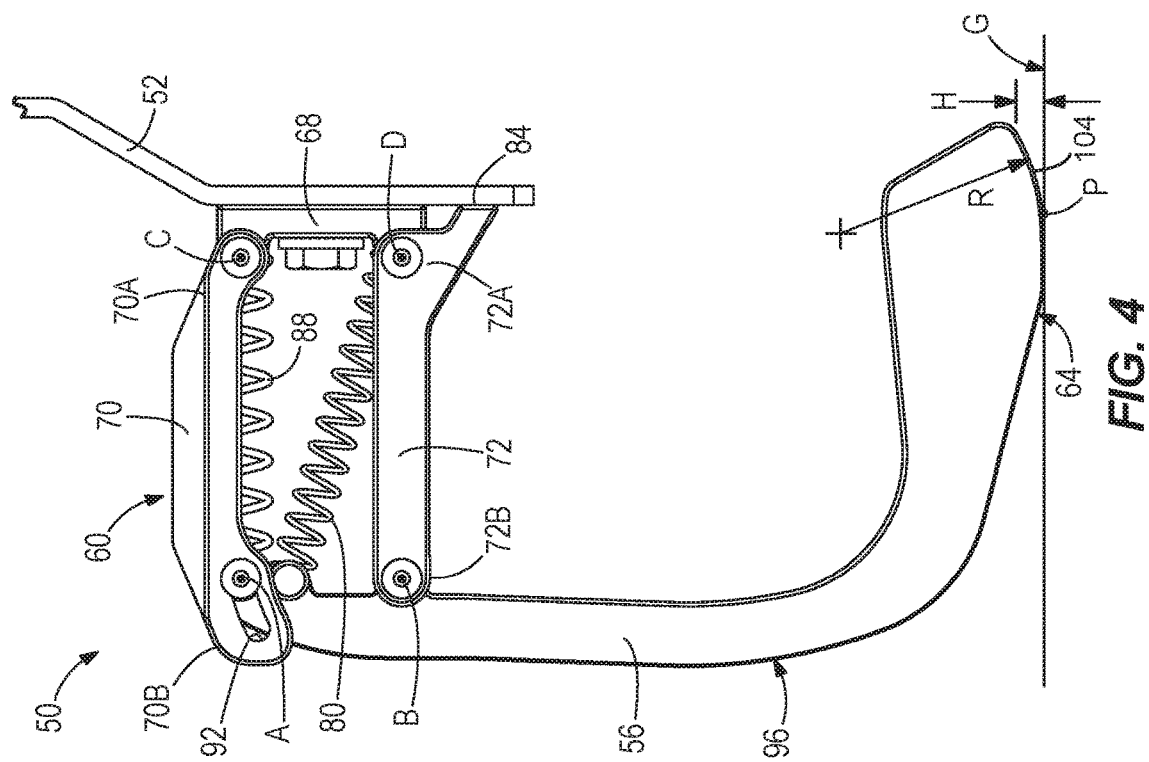

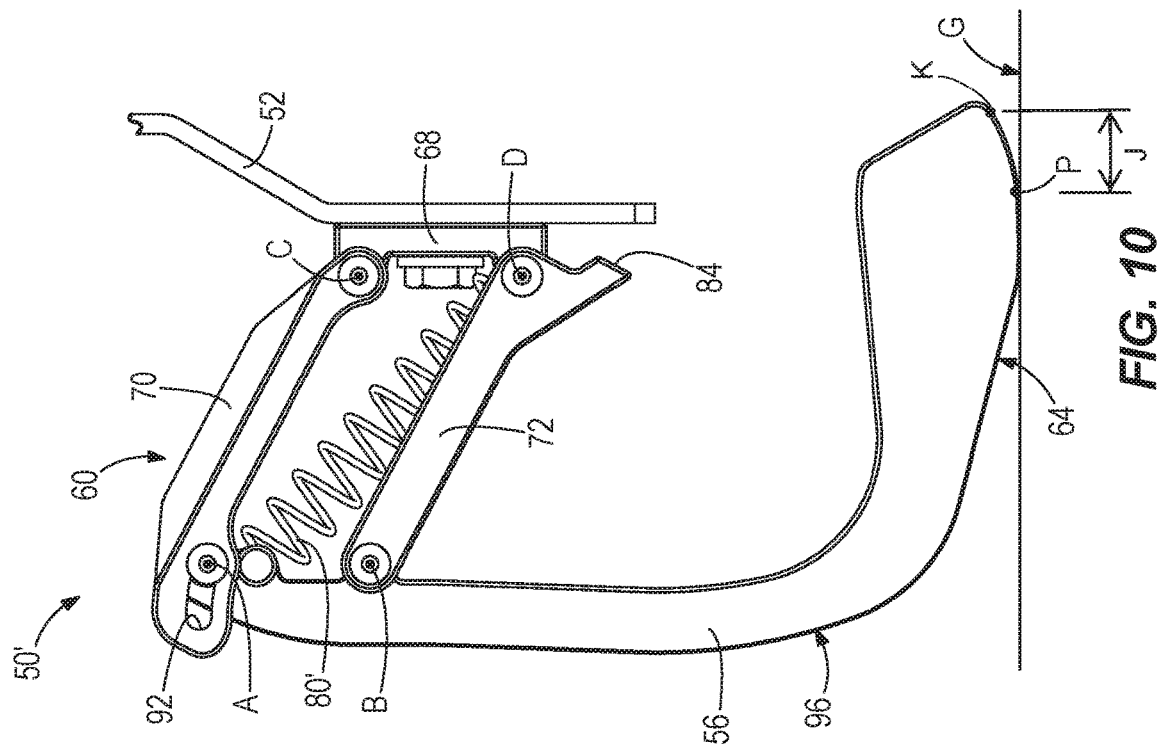
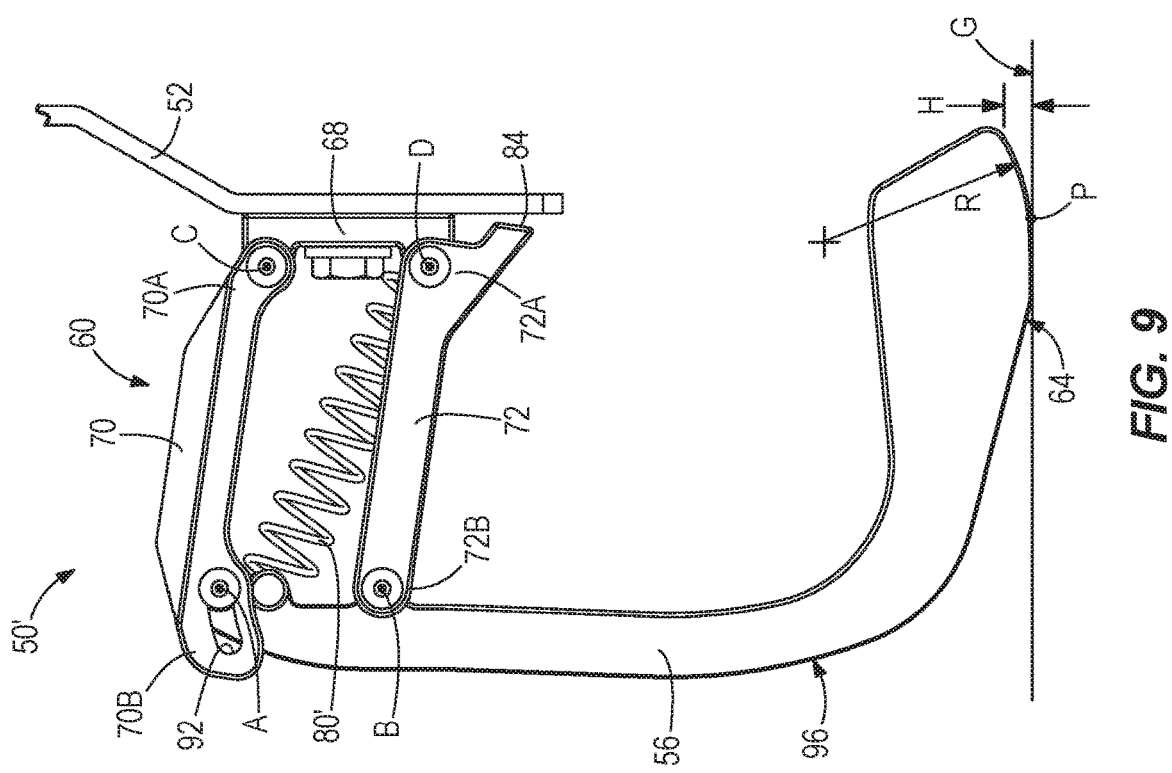
FIG. 9
FIG. 10

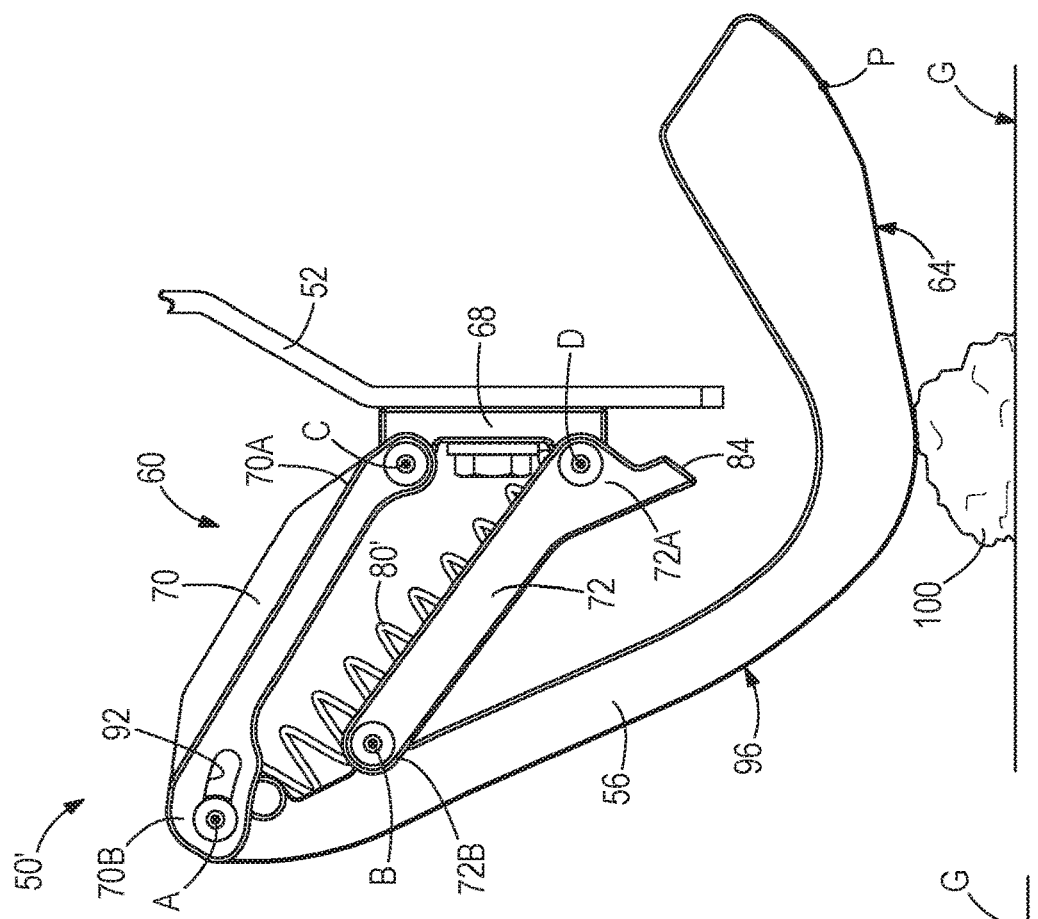
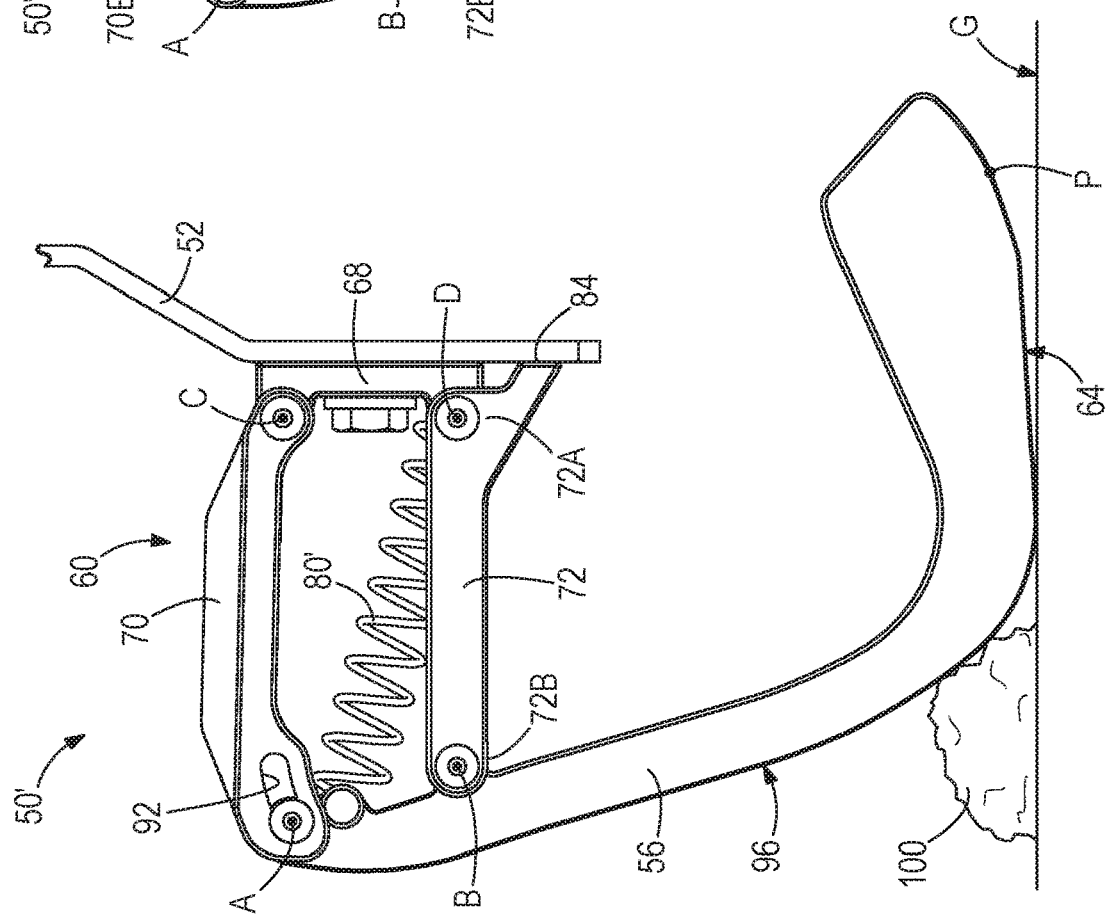

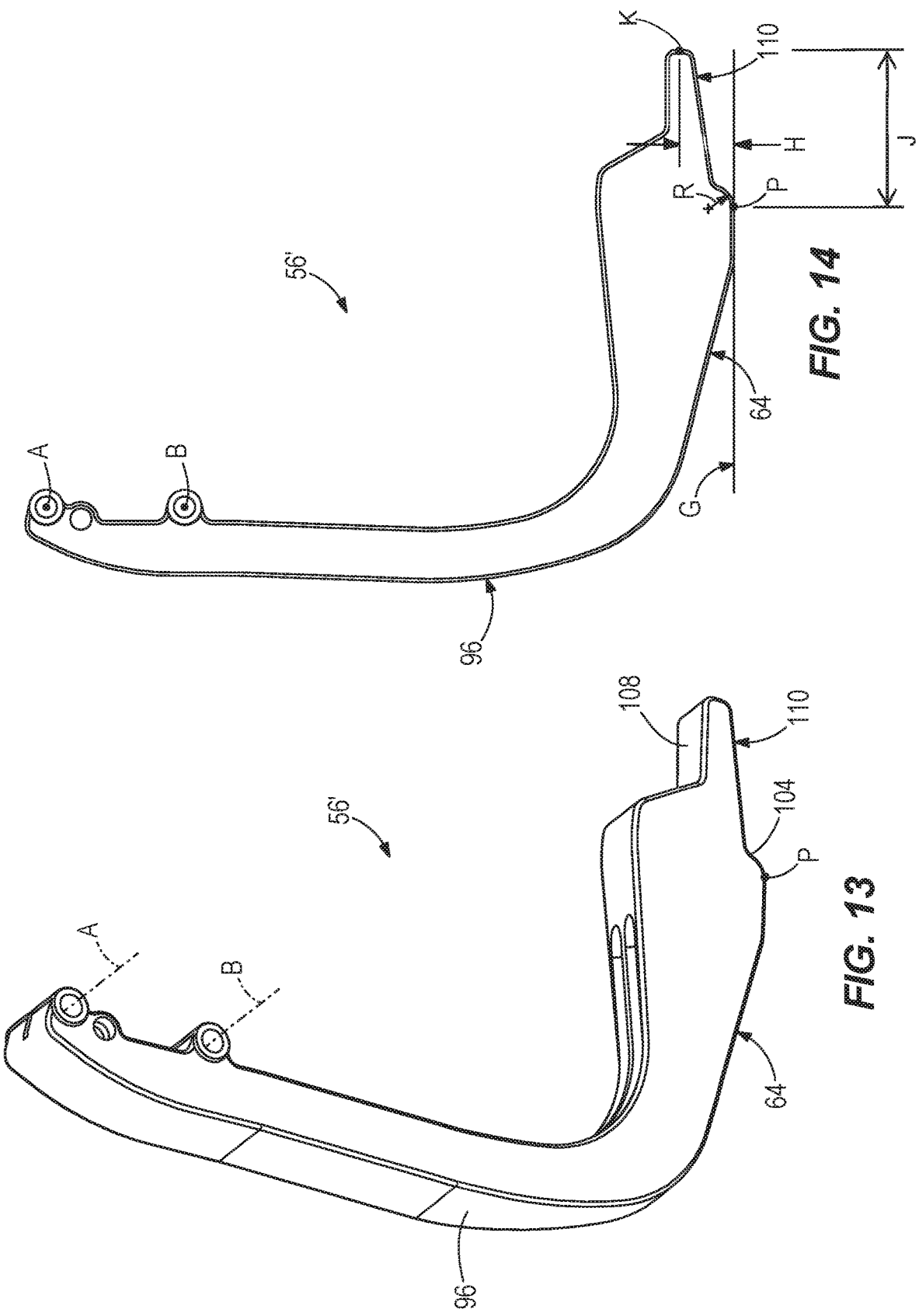

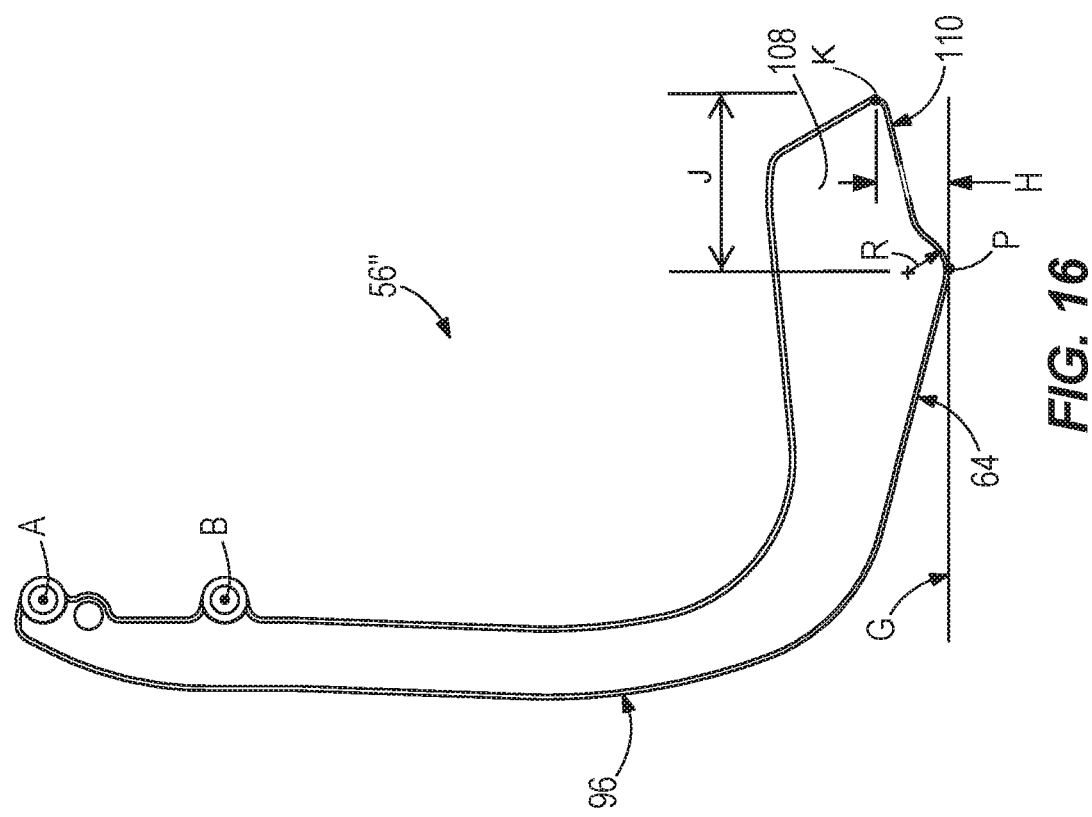
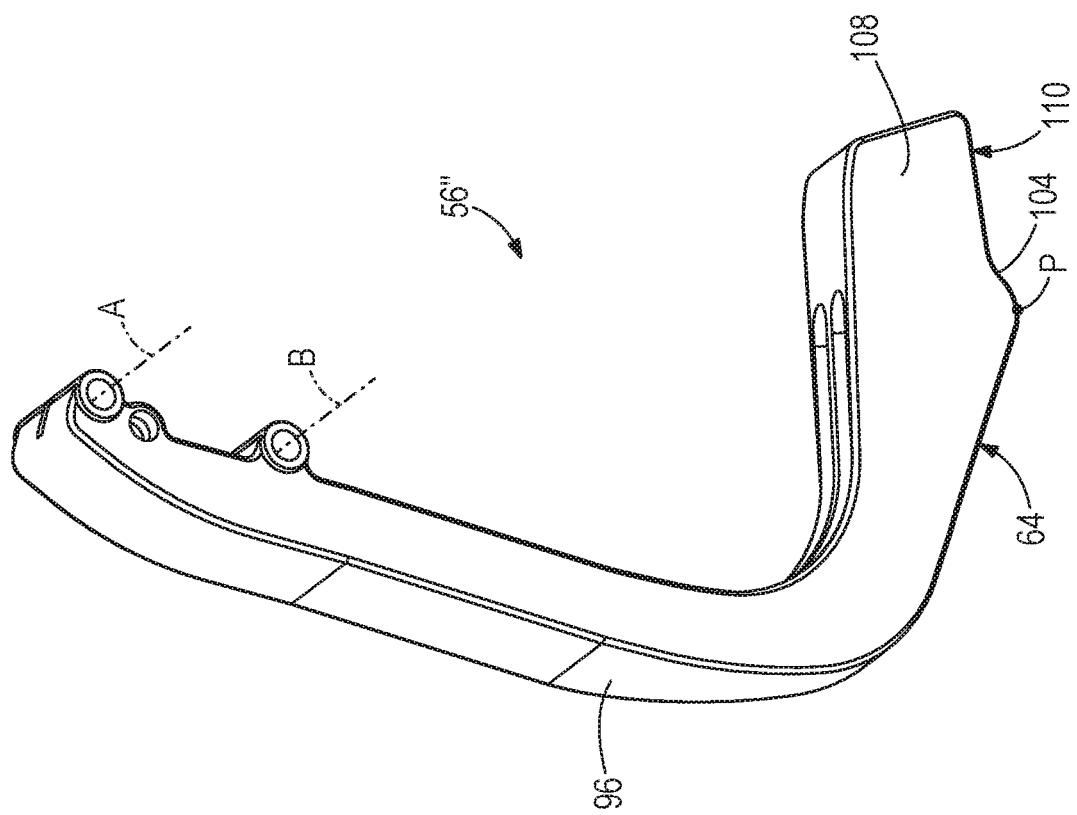

US 10,531,605 B2

SEED FIRMER AND PLANTING MACHINE

CROSS-REFERENCE TO RELATED APPLICATIONS

This application is a continuation of U.S. patent application Ser. No. 15/232,498, filed Aug. 9, 2016, which is a continuation-in-part of U.S. patent application Ser. No. 14/871,222, filed on Sep. 30, 2015, the entire contents of both of which are incorporated by reference herein.

BACKGROUND

The disclosure relates to furrow following devices, such as seed firmers for pressing seeds into soil, used in agricultural planting. More particularly, the disclosure relates to the shape and mounting of such devices.

SUMMARY

The disclosure sets forth, in one aspect, a furrow following device for a planting machine. The furrow following device includes an attachment bracket having a portion provided for attachment to a row unit of a planting machine. An arm is provided with a ground-facing surface for engagement with the soil during planting. A mount has a first portion coupled to the attachment bracket, and a second portion at least partially defining a pivot connection with the arm. The pivot connection provides relative rotation between the arm and the mount. The mount is a compliant mount provided with a spring that exhibits an elastic bias force as the arm is raised toward the attachment bracket.

The disclosure sets forth, in another aspect, a furrow following device for a planting machine. An arm is provided with a ground-facing surface for engagement with the soil during planting. A pivot connection is located along the arm, the pivot connection defining an axis for rotation of the arm. The arm is supported by a compliant mount including a spring. The pivot connection is positioned at a fixed location along the arm that is between the ground-facing surface and a portion of the arm to which the spring is attached.

The disclosure sets forth, in another aspect, a seed firmer for pressing seeds into soil during planting. The seed firmer includes a mount for attachment to a row unit of a planting machine. An arm defines a ground-facing surface having at least one point of contact with the ground, including a rearmost ground contact point with respect to a direction of forward travel during planting. The ground-facing surface has a transition section directly trailing a rearmost ground contact point, the transition section extending upwardly from the rearmost ground contact point with a radius no less than 25 mm.

The disclosure sets forth, in another aspect, a seed firmer for pressing seeds into soil during planting. The seed firmer includes an arm defining a ground-facing surface having at least one ground contact point for driving seeds into soil as the arm is moved across the soil. A first link has a first end arranged for connection to a planting machine and a second end defining a first pivot connection with the arm such that the arm is pivotable relative to the first link about a first pivot axis. A second link has a first end arranged for connection to the planting machine and a second end defining a second pivot connection with the arm such that the arm is pivotable relative to the second link about a second pivot axis spaced from the first pivot axis.

The disclosure sets forth, in another aspect, a seed firmer for pressing seeds into soil during planting. The seed firmer includes an arm defining a ground-facing surface having at least one point of contact with the ground, including a rearmost ground contact point with respect to a direction of forward travel during planting. The ground-facing surface has a transition section directly trailing a rearmost ground contact point, the transition section extending upwardly from the rearmost ground contact point. The ground-facing surface includes an overhang rearward of the transition section, the overhang including an anti-rebound surface spaced above the rearmost ground contact point.

The disclosure also sets forth, in yet another aspect, a seed firmer for pressing seeds into soil during planting, wherein the seed firmer includes an arm defining a ground-facing surface having at least one point of contact with the ground, including a rearmost ground contact point with respect to a direction of forward travel during planting operations. The ground-facing surface directly trailing the rearmost ground contact point extends upwardly from the rearmost ground contact point to define a horizontal distance and a vertical height within a rearmost section of the ground-facing surface. A ratio of the horizontal distance to the vertical height is no less than 1.2:1.

Further aspects are set forth in the detailed description and accompanying drawings.

BRIEF DESCRIPTION OF THE DRAWINGS

FIG. 4 is a side view of the seed firmer of FIG. 3, shown in a lower limit position.

FIG. 5 is a side view of the seed firmer of FIG. 3, shown in an upwardly-shifted position.

FIG. 9 is a side view of the seed firmer of FIG. 8, shown in a normal running position.

FIG. 10 is a side view of the seed firmer of FIG. 8, shown in an upwardly-shifted position.

FIG. 11 is a side view of the seed firmer of FIG. 8, shown in a first tripped position.

FIG. 12 is a side view of the seed firmer of FIG. 8, shown in a second tripped position.

FIG. 13 is a perspective view of a seed firmer according to yet another embodiment.

FIG. 14 is a side view of the seed firmer of FIG. 13.

FIG. 15 is a perspective view of a seed firmer according to yet another embodiment.

FIG. 16 is a side view of the seed firmer of FIG. 15.

DETAILED DESCRIPTION

Before any embodiments are explained in detail, it is to be understood that the disclosure is not limited in its application to the details of construction and the arrangement of components set forth in the following description or illustrated in the accompanying drawings.

Figure 1:
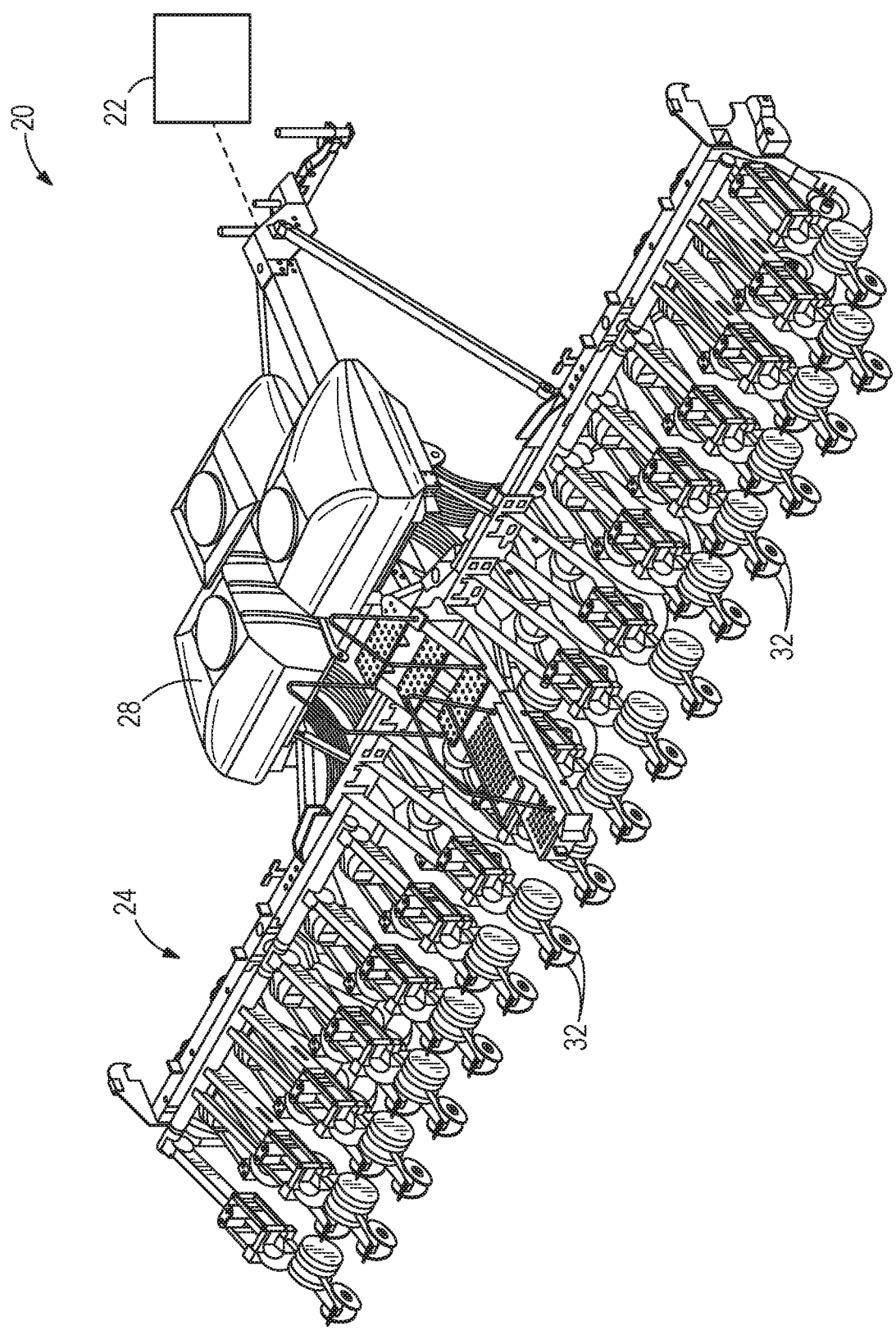
FIG. 1 is a perspective view of a planter including a plurality of row units.
Figure 2:
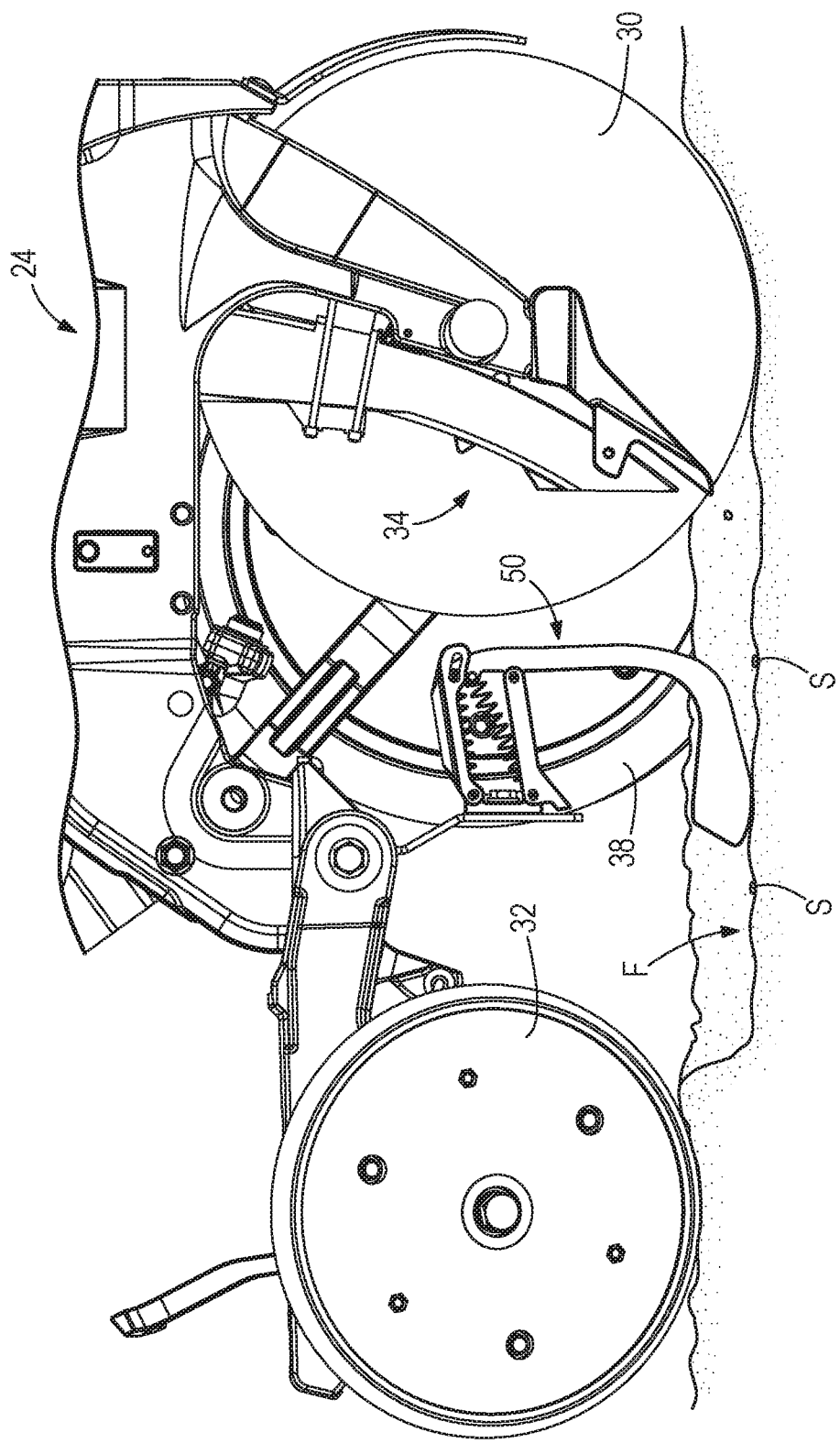
FIG. 2 is a schematic view of a planting operation carried out with one of the row units of FIG. 1.
Figure 3:
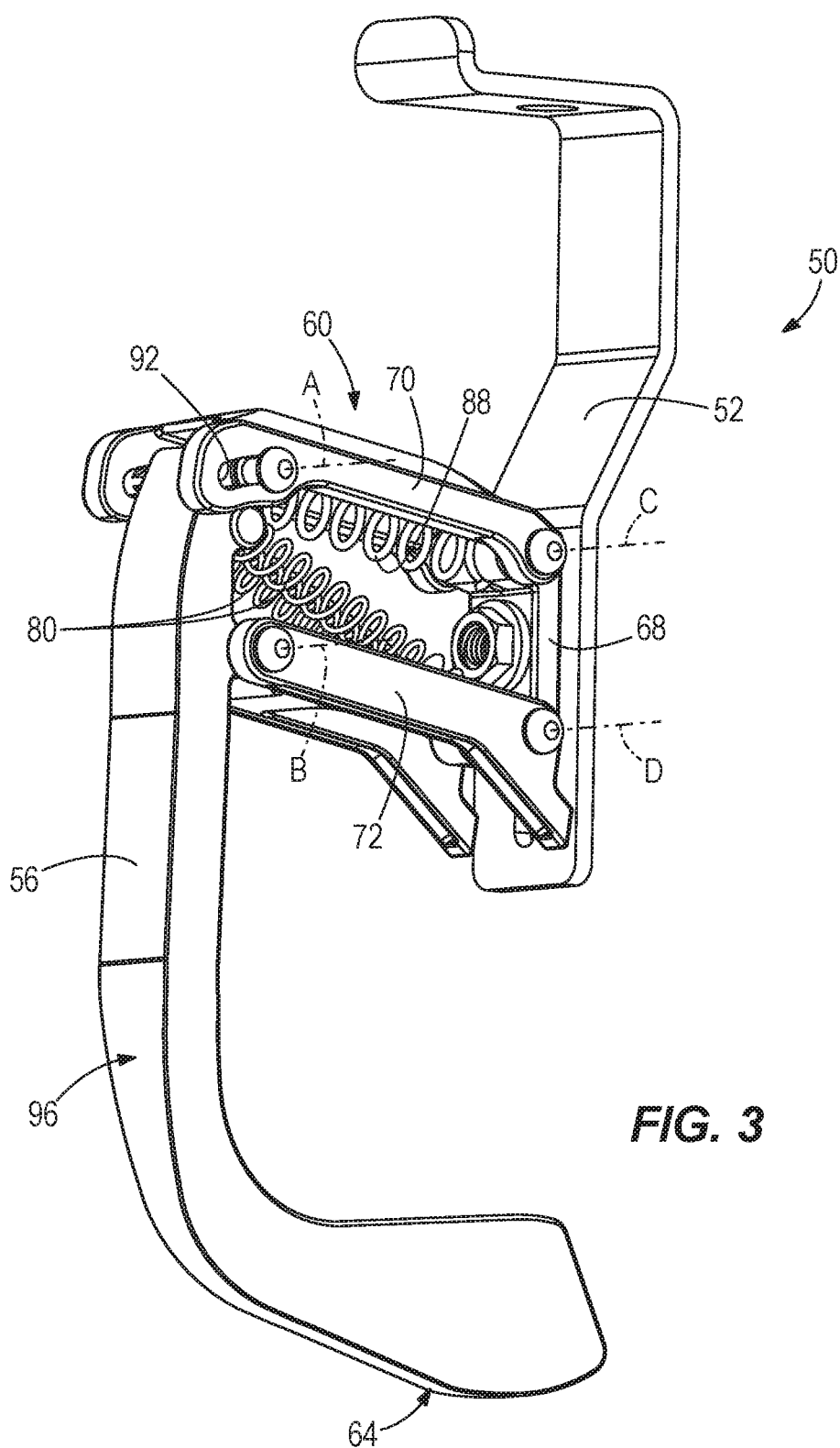
FIG. 3 is a perspective view of a seed firmer according to one embodiment, for one of the row units of the planter of FIG. 1.

FIG. 1 illustrates an agricultural planting machine 20 connected to a tractor 22 for planting seeds into soil as the planting machine 20 is conveyed by the tractor 22 through a field. The planting machine 20 includes a plurality of row units 24 provided side-by-side with each other for simultaneously planting a plurality of crop rows. Each row unit 24 can include one or more hoppers 28 for seeds S (FIG. 2), and in some constructions can deliver liquid and/or granular additives such as fertilizer or pesticide that can selectively accompany the seeds S when planted. As shown in FIG. 2, each row unit 24 has an opener 30 operable to cut a trench or furrow F into the soil as the planting machine 20 moves along the ground. A set of closing wheels 32 trail behind the opener 30 and are operable to close the furrow F after seeds are dispensed. A cartridge 34 of the row unit 24 operates to dispense seeds S rearward of the opener 30 into the furrow F, prior to arrival of the closing wheels 32. In some constructions, the row unit 24 is a high performance device in which the cartridge 34 is operable to accurately dispense the seeds S at regular intervals at high forward travel speed (e.g., over 7 miles per hour, and even over 9 or 10 miles per hour) of the planting machine 20 relative to the ground, referred to herein as planting speed. The cartridge 34 can include a brush belt 38 as part of a seed delivery mechanism. The cartridge 34 may operate to dispense the seeds S rearward and downward such that a horizontal velocity component is equal in magnitude to the planting speed, and oriented in the opposite direction such that each seed S approaches the ground with no net horizontal velocity to reduce bounce and enhance repeatability in the final seed positioning. In other constructions, the cartridge 34 may comprise a gravity drop seed tube where the geometry of the tube is intended to provide a horizontal velocity component is equal or near equal in magnitude to a given planting speed. Although the planting machine 20 provides high precision planting at high planting speeds, it is sometimes preferable to also firm the seeds S into the soil by running over them with an additional implement, known as a "seed firmer", after placement and prior to closing of the furrow F. A seed firmer is one example of a furrow following device that can be used with a planting machine. Other furrow following devices include a soil sensor carrier and a furrow shaper. Aspects of the furrow following device are described below in the context of a seed firmer.

FIGS. 3-7 illustrate a seed firmer 50 and an attachment bracket 52 for removably mounting the seed firmer 50 to the row unit 24 of the planting machine 20. It will be understood that a separate and identical seed firmer 50 may be provided on each and every one of the row units 24 or any subset thereof. The seed firmer 50 includes an arm 56 and a mount 60 coupled to the arm 56 for attaching the arm 56 to a row unit 24 of the planting machine 20. The mount 60 can extend between the arm 56 and the attachment bracket 52, or directly between the arm 56 and the row unit 24 if no attachment bracket is provided. As discussed in further detail below, the mount 60 can attach to the arm 56 at multiple points and provide controlled, suspended travel of the arm 56 relative to the row unit 24. The arm 56 includes an upper portion coupled to the mount 60 and a lower portion including a ground-facing surface 64. The lower arm portion defining the ground-facing surface 64 extends rearward of the upper arm portion with respect to a direction of forward travel during planting operation. As illustrated, the upper arm portion extends primarily vertically when mounted for use, while the lower portion extends primarily horizontally. Although any ground surface of planting soil will have irregularities, the description herein assumes for convenience in describing the structure of the seed firmer 50 that the planting machine 20, along with the seed firmer 50, is conveyed in a direction perpendicular to a flat ground surface G.

The seed firmer 50 is mounted on the row unit 24 such that the ground-facing surface 64 has at least one point of contact with the ground G. In other words, the ground-facing surface 64 has at least one lowest point when the seed firmer 50 is in a mounted configuration on the row unit 24, operational for seed firming. Although not required in all constructions, the ground-facing surface 64 of the illustrated arm 56 includes a plurality of lowest points forming a flat section. Other constructions may dispense with all or a portion of the flat section and provide a single lowest point. Whether or not the ground-facing surface 64 has multiple points of ground contact, a rearmost ground contacting point P is defined with respect to the direction of forward travel during planting operations, and a rearmost point of the arm K is also defined with respect to the direction of forward travel during planting operations. The arm 56, as well as other portions of the seed firmer 50, may be constructed of ultra-high molecular weight polyethylene (UHMWPE), among other materials. As discussed below, the seed firmer 50 provides a non-compliant arm 56 with a compliant mount 60. By non-compliant, it is meant that the arm 56 is not designed to provide the downward-firming action through compliance, or elastic compression of its material, as this can lead to creep over time. By avoiding a compliant arm, adjusting, re-mounting, and the associated guesswork associated with compliant arms are avoided.

The mount 60 may take the form of a parallel linkage including the arm 56, a stationary or base link 68 fixed to the attachment bracket 52, and a pair of parallel intermediate links 70, 72 between the base link 68 and the arm 56. In some constructions, the base link 68 is defined at least in part by the bracket 52. Also, although the intermediate links 70, 72 are parallel in the illustrated embodiment of FIGS. 2-7, the intermediate links 70, 72 need not necessarily be parallel, and can instead be slightly skewed with respect to one another while still providing a desired movement and positional relationship of the arm 56 with respect to the ground in up and down movement of the arm 56. The mount 60 allows movement of the arm 56 relative to base link 68 and the row unit 24 without altering the orientation of the arm 56, particularly the ground-facing surface 64, with respect to the ground G. The first intermediate link 70 has a first end 70A arranged for connection to the row unit 24 by a pivotable connection to the base link 68, which is fixed in position on the row unit 24. A second end 70B of the first intermediate link 70 is pivotably connected with the arm 56 such that the arm 56 is pivotable relative to the first intermediate link 70 about a first pivot axis A. The second intermediate link 72 has a first end 72A arranged for connection to the row unit 24 by a pivotable connection to the base link 68, and a second end 72B pivotably connected with the arm 56 such that the arm 56 is pivotable relative to the second intermediate link 72 about a second pivot axis B parallel to and spaced from the first pivot axis A. Due to the parallel arrangement, the spacing distance between the first and second pivot axes A, B is equal to the spacing distance between third and fourth pivot axes C, D provided at the pivot connections between the base link 68 and the first ends 70A, 72A of the first and second intermediate links 70, 72, respectively. Along the arm 56, the pivot connection with the first intermediate link 70 is spaced further from the ground-facing surface 64 than the pivot connection with the second intermediate link 72, such that the first intermediate link 70 is above the second intermediate link 72. Each of the pivot connections at the four pivot axes A, B, C, D can be provided by a rotatable pin joint including a pin (e.g., rivet, axle, etc.) that secures the joined elements while allowing relative rotation therebetween. It is also noted that either or both of the first and second intermediate links 70, 72 can be bifurcated or even provided as two separately-formed elements, mirrored to share common pivot axes such that they function as a single link.

At least one first spring 80 is extended between the pivot connection at the fourth pivot axis D (at the first end 72A of the second intermediate link 72) and the arm 56, such as (for example) at a point between the two pivot axes A, B. The arm 56 can include an attachment structure, or spring anchor 79, to which the first spring 80 is secured. The spring anchor 79 can be provided in the form of a hole and/or a pin. In some constructions, the first spring 80 provides a bias force that increases as the ground-facing surface 64 moves closer to the first ends 70A, 72A of the first and second intermediate links 70, 72 (i.e., as the arm 56 moves upward). The first spring 80 can be in tension throughout all or a majority of a range of motion of the arm 56. A lower limit of the range of motion (FIG. 4) can be defined by an abutment surface 84 provided on the second intermediate link 72, for example at the first end 72A facing the attachment bracket 52 for contact therewith. Although the abutment surface 84 provides a lower limit for the arm 56, the row unit may be configured such that a normal or neutral running position of the arm 56 is with the abutment surface 84 spaced away from the attachment bracket 52 to place the first spring 80 in an increased state of tension compared to the lower limit position of FIG. 4. This allows the arm 56 room to move both upward and downward relative to the base link 68 on the row unit 24 within the active range of the spring to account for ground irregularity during use. The first spring 80 can include multiple, separately-formed springs positioned in parallel as shown in FIG. 1 to provide an increased effective spring rate to the mount 60, without relying on a particularly heavy or large spring, although any number of springs exerting any desired level of spring force can be used as desired. In addition, the first spring 80 can be provided as a coil spring as shown, or as another type of elastic biasing member. The first spring 80 exhibits an elastic biasing force on the arm 56 as the arm 56 is raised toward the attachment bracket 52. In some constructions, the elastic biasing force from the first spring 80 increases with increasing movement of the arm 56 (e.g., upward movement toward the attachment bracket 52). Regardless of the particular spring construction or bias force relationship, the first spring 80 provides the mount 60 with compliance so that the arm 56 can follow an uneven ground surface G without relying whatsoever on flexure in the arm 56. Meanwhile, the attachment bracket 52 can be fixedly secured to the row unit 24.

Figure 7:
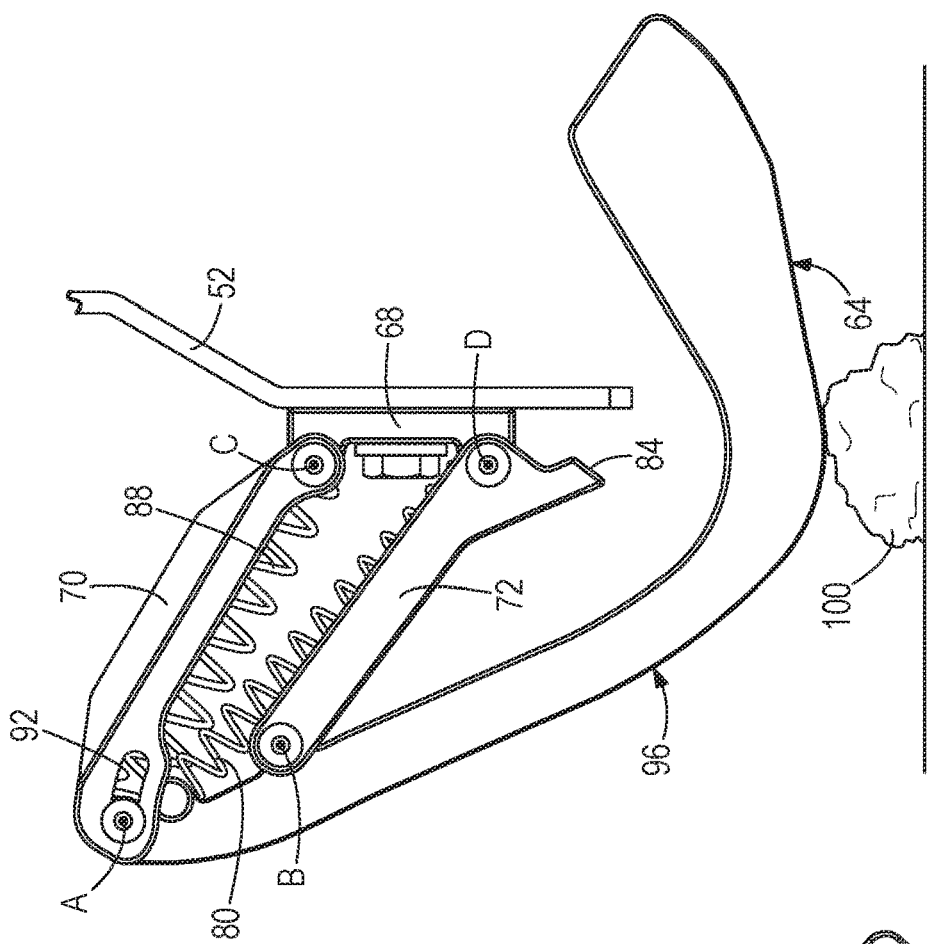
FIG. 7 is side view of the seed firmer of FIG. 3, shown in a second tripped position.
Figure 6:
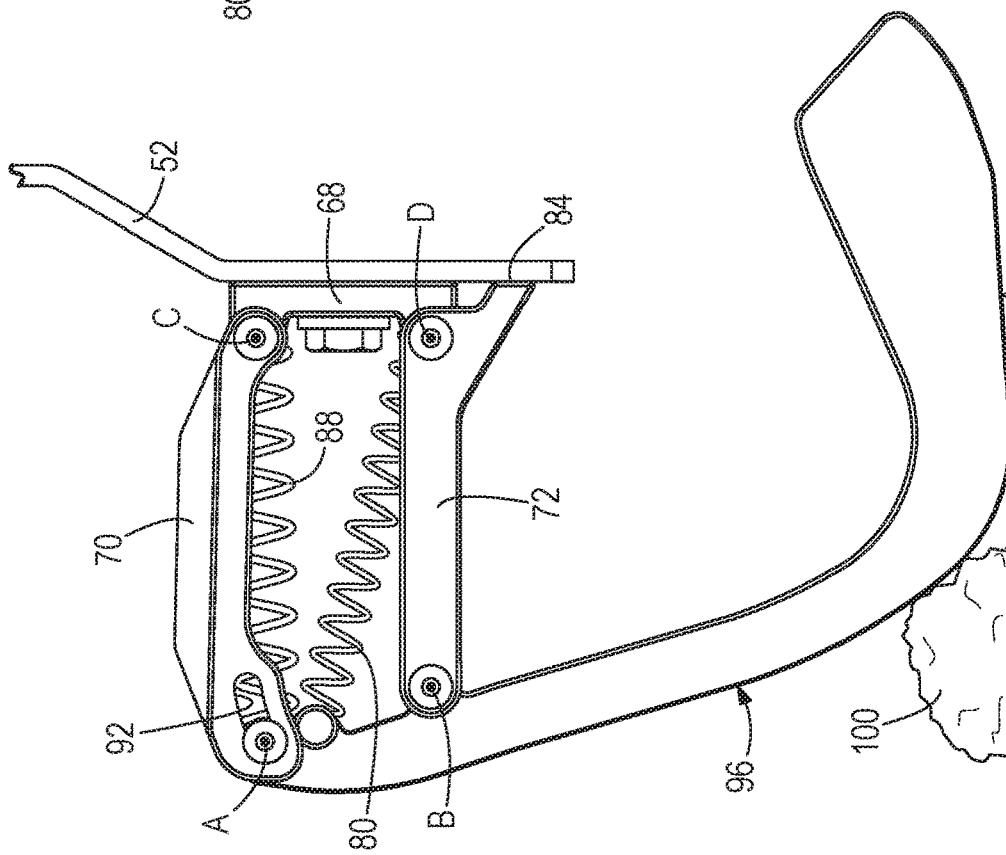
FIG. 6 is a side view of the seed firmer of FIG. 3, shown in a first tripped position.
Figure 8:
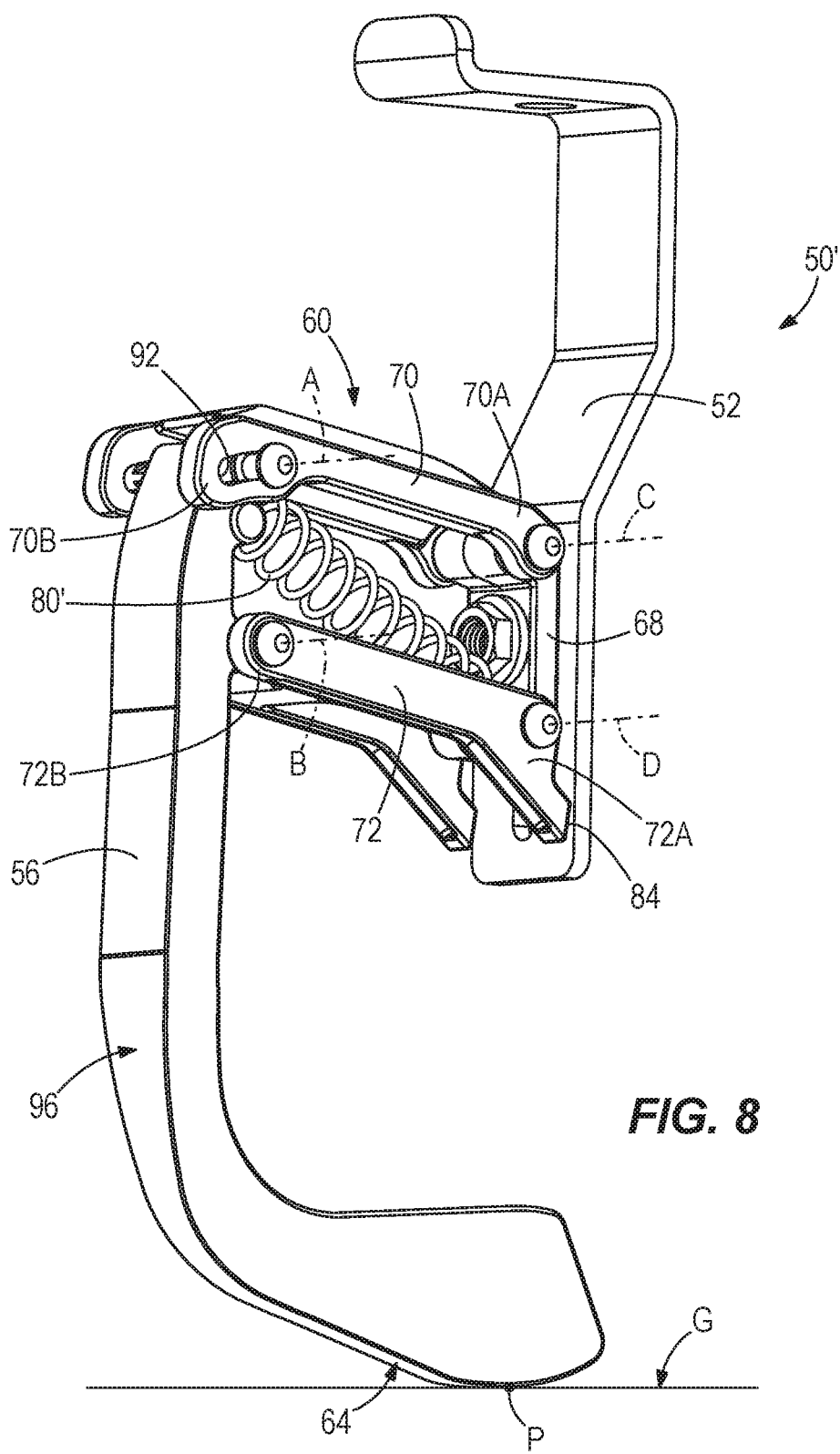
FIG. 8 is a perspective view of a seed firmer according to another embodiment, for one of the row units of the planter of FIG. 1.

With continued reference to the illustrated embodiment shown in FIGS. 4 and 5, at least one second spring 88 extends between the pivot connection at the third pivot axis C (at the first end 70A of the first intermediate link 70) and the point connection at the first pivot axis A (at the second end 70B of the first intermediate link 70). In normal operation throughout the up and down motion of the arm 56 and shown in FIGS. 4 and 5, the second spring 88 operates without deflecting to maintain the first pivot axis A as a fixed axis between the arm 56 and the first intermediate link 70. In order to maintain the first pivot axis A fixed, the second spring 88 biases the pin defining the first pivot axis A to a first end of a slot or channel 92 in which it is slidably received to define a selective sliding joint. The channel 92 can be provided in the second end 70B of the first intermediate link 70 as shown, although the pin-slot relationship may be reversed. Although a pin and slot arrangement is shown in FIGS. 4-6, any other connection enabling relative movement of the first pivot axis A with respect to the first intermediate link 70 can be used. Upon substantial load to a leading surface 96 of the arm 56, outside the normally expected ground undulation, the second spring 88 allows the arm 56 to temporarily trip in a manner that alters the linkage motion to operate in non-parallel link fashion, as the first and second intermediate links 70, 72 assume an alternate non-parallel relationship. Although such motion will alter the orientation of the arm 56 relative to the ground G as shown in FIGS. 6 and 7, tripping the arm 56 upward in this manner selectively allows an additional degree of freedom to protect the seed firmer 50 from impact and potential damage in the event that the arm 56 encounters an immovable object 100 (e.g., root, stone, etc.). During tripping, the arm 56 pivots about the second pivot axis B relative to the first intermediate ink 70 until the pin at the first pivot axis A reaches a second end of the channel 92, or a substantial amount to allow the arm 56 to clear the immovable object 100. Upon passing by the immovable object 100, the second spring 88 biases the first pivot axis A back to its normal position in the channel 92 to put the mount 60 back into the configuration where the first and second intermediate links 70, 72 are parallel. As with the first spring 80, the second spring 88 can include multiple, separately-formed springs and can be provided as a coil spring as shown, or as another type of elastic biasing member. In other constructions, the second spring 88 and the ability of the first pivot axis A to slide to different positions with respect to the first intermediate link 70 are not provided.

Returning now to the arm 56, the ground-facing surface 64 has a transition section 104 (FIG. 4) directly trailing the rearmost ground contact point P. The transition section 104 is provided as a curved profile, which may be oriented with its forward end tangent to the rearmost ground contact point P. The transition section 104 extends upwardly from the rearmost ground contact point P with a relatively large radius R. For example, the radius R of the transition section 104 is 25 mm or greater. As such, the radius R may approach infinity such that all or a portion of the transition section 104 is flat. In some constructions, the radius R is not less than 40 mm. In some constructions, the radius R is not less than 60 mm. The large radius transition section 104 extends a height H at least 2 mm higher than the rearmost ground contact point P, and in some constructions, at least 3 mm higher than the rearmost ground contact point P. The height H is measured vertically with the arm 56 in the normal running position for seed firming. The radius R within the transition section 104 may be constant or may change one or more times throughout, optionally including one or more flat sections. In some constructions, a shape characteristic of the transition section 104 is expressed as a ratio of the distance (J in FIG. 5) between the rearmost contact point P and a rearmost point (K in FIG. 5) and the height H. The height H is measured vertically with the arm 56 in the normal running position for seed firming, and the distance J is measured laterally, perpendicular to the height H. The ratio of J/H is no less than about 1.2:1 in some constructions. In some constructions, the ratio of J/H is no less than about 1.5:1. In still other constructions, the ratio of J/H is no less than about 2:1. Although the rearmost point K is illustrated as the point at which the radius changes from the radius R to a substantially smaller radius, the transition section 104 may alternately be considered in this or other embodiments to extend all the way to a rearmost point of the arm 56. Considered as such, the distance J and the height H will vary, but it will be understood that the exemplary ratios of J/H stated above may still apply. The transition section 104 may form a rearmost section of the ground-facing surface 64.

The transition section 104 is provided to ensure that the seeds S are not flicked upward when running the planting machine 20 in dry soil conditions at high speed, as defined above. Whereas a seed firmer having a small radius at the point of transition away from the ground may be effective in many soil conditions and speeds, the results with firm soil and/or high planting speeds may contribute to uneven seed depth and spacing, which the inventors have identified as attributable to a flicking action that the seed firmer may impart to some of the seeds. The flicking action can drive the seed back into the air above the ground, leading to uncontrollable seed positioning. Especially at high planting speeds where minimal time elapses between seed ejection and the arrival of the closing wheels 32, the closing wheels 32 may even close the furrow F while the seed is airborne, which leads to critical seed depth error. By precisely controlling how the ground-facing surface 64 of the arm 56 departs from each seed S, flicking is reduced or eliminated even in firm soil when the planting speed is high (e.g., over 7 miles per hour, and even over 9 or 10 miles per hour).

FIGS. 8-12 illustrate a seed firmer 50' according to another construction that is similar to the firmer 50 of FIGS. 3-7, except as noted below. Where not specifically described, the structure is as set forth in the drawings and the above description, and reference numbers are maintained consistent where appropriate. At least one first spring 80' is extended between the pivot connection at the fourth pivot axis D (at the first end 72A of the second intermediate link 72) and the arm 56 at a point between the two pivot axes A, B. The first spring 80' provides a bias force that increases as the ground-facing surface 64 moves closer to the first ends 70A, 72A of the first and second intermediate links 70, 72 (i.e., as the arm 56 moves upward). The first spring 80' can be in tension throughout all or a majority of a range of motion of the arm 56. Although an abutment surface 84 provides a lower limit for the arm 56, the row unit may be configured such that a normal or neutral running position of the arm 56 (FIG. 9) is with the abutment surface 84 spaced away from the attachment bracket 52 to place the first spring 80' in an increased state of tension compared to the lower limit position. The first spring 80' can include multiple, separately-formed springs positioned in parallel to provide an increased effective spring rate to the mount 60, without relying on a particularly heavy or large spring. In addition, the first spring 80' can be provided as a coil spring as shown, or as another type of elastic biasing member.

Unlike the construction of FIGS. 3-7, the first spring 80' is the only spring provided in the mount 60, and the first spring 80' is also responsible for maintaining the first pivot axis A as a fixed axis between the arm 56 and the first intermediate link 70 in normal operation throughout the up and down motion of the arm 56 as shown in FIGS. 9 and 10. In order to maintain the first pivot axis A fixed, the first spring 80' biases the pin defining the first pivot axis A to a first end of a slot or channel 92 in which it is slidably received to define a selective sliding joint. The channel 92 can be provided in the second end 70B of the first intermediate link 70 as shown, although the pin-slot relationship may be reversed. Upon substantial load to a leading surface 96 of the arm 56, outside the normally expected ground undulation, the first spring 80' allows the arm 56 to temporarily trip in a manner that alters the linkage motion to operate in non-parallel link fashion, as the first and second intermediate links 70, 72 assume an alternate non-parallel relationship. Although such motion will alter the orientation of the arm 56 relative to the ground G as shown in FIGS. 11 and 12, tripping the arm 56 upward in this manner selectively allows an additional degree of freedom to protect the seed firmer 50 from impact and potential damage in the event that the arm 56 encounters an immovable object 100 (e.g., root, stone, etc.). During tripping, the arm 56 pivots about the second pivot axis B relative to the first intermediate ink 70 until the pin at the first pivot axis A reaches a second end of the channel 92, or a substantial amount to allow the arm 56 to clear the immovable object 100. Upon passing by the immovable object 100, the first spring 80' biases the first pivot axis A back to its normal position in the channel 92 to put the mount 60 back into the configuration where the first and second intermediate links 70, 72 are parallel.

FIGS. 13 and 14 illustrate a seed firmer arm 56' according to another construction that is similar to the arm 56 of the seed firmers 50, 50' of FIGS. 3-12, except as noted below. Where not specifically described, the structure is as set forth in the drawings and the above description, and reference numbers are maintained consistent where appropriate. The ground-facing surface 64 of the arm 56' includes a contour or profile that includes a rearmost ground contact point P. Although the rearmost ground contact point P is shown at the trailing end of a flat section of ground contacting points, the rearmost ground contact point P may be the single lowest point on the arm 56. Toward the trailing side of the rearmost ground contact point P, a transition section 104 is provided with a radius R. At the termination of the transition section 104, which may have a single constant radius or multiple radii, the arm 56' includes an overhang 108 defining an anti-rebound surface 110 as part of the ground-facing surface 64. Together, the transition section 104 and the anti-rebound surface 110 form a rearmost section of the ground-facing surface 64. In the normal operating position of the seed firmer, the anti-rebound surface is within 30 degrees of parallel to the ground G, and in some constructions, may be within 15 degrees or within 10 degrees of parallel to the ground G. At the leading edge of the anti-rebound surface 110, which is the trailing end of the transition section, the height can be 7 mm or less. More particularly, the height can be 5 mm or less, or even 3 mm or less. Although the radius R of the transition section 104 can be a large radius as defined above with respect to the arm 56 of FIGS. 3-7, the radius R may be less than 25 mm in some constructions such that the arm 56' does not rely solely on the transition section 104 for seed control, but also the anti-rebound surface 110 of the overhang 108, which significantly limits any upward travel of a seed S that is indeed flicked upward upon traversal of the rearmost ground contact point P (e.g., due to a combination of high planting seed and firm soil). Although the anti-rebound surface 110 can be flat as shown, it may also be curved, for example concave. To ensure predictable deflection, the anti-rebound surface 110 can be formed as a continuous surface, free of notches, recesses, ridges, divots, etc. The ratios of lateral distance J to height H may be within the particular ranges identified with respect to the earlier embodiments, however, the lateral distance J for the embodiment of FIGS. 13 and 14 is measured from the rearmost ground contact point P to a rearmost point K of the arm 56' and the height H is measured up to the height of the rearmost point K.

FIGS. 15 and 16 illustrate a seed firmer arm 56" according to another construction that is similar to the arm 56 of the seed firmers 50, 50' of FIGS. 3-12, except as noted below. Where not specifically described, the structure is as set forth in the drawings and the above description, and reference numbers are maintained consistent where appropriate. The ground-facing surface 64 of the arm 56" includes a contour or profile that includes a rearmost ground contact point P. Although the rearmost ground contact point P is shown as the single lowest point on the arm 56, the rearmost ground contact point P may be at the trailing end of a flat section of ground contacting points. Toward the trailing side of the rearmost ground contact point P, a transition section 104 is provided with a radius R up to a height. At the termination of the transition section 104, which may have a single constant radius or multiple radii, the arm 56" includes an overhang 108 defining an anti-rebound surface 110 as part of the ground-facing surface 64. Together, the transition section 104 and the anti-rebound surface 110 form a rearmost section of the ground-facing surface 64. In the normal operating position for seed firming operation, the anti-rebound surface is within 30 degrees of parallel to the ground G, and in some constructions, may be within 15 degrees or within 10 degrees of parallel to the ground G. At the leading edge of the anti-rebound surface 110, which is the trailing end of the transition section, the height can be 7 mm or less. More particularly, the height can be 5 mm or less, or even 3 mm or less. Although the radius R of the transition section can be a large radius as defined above with respect to the arm 56 of FIGS. 3-7, the radius R may be less than 25 mm in some constructions such that the arm 56" does not rely solely on the transition section 104 for seed control, but also the anti-rebound surface 110 of the overhang 108, which significantly limits any upward travel of a seed S that is indeed flicked upward upon traversal of the rearmost ground contact point P (e.g., due to a combination of high planting seed and firm soil). Although the anti-rebound surface 110 can be flat as shown, it may also be curved, for example concave. To ensure predictable deflection, the anti-rebound surface 110 can be formed as a continuous surface, free of notches, recesses, ridges, divots, etc. The ratios of lateral distance J to height H may be within the particular ranges identified with respect to the earlier embodiments, however, the lateral distance J for the embodiment of FIGS. 15 and 16 is measured from the rearmost ground contact point P to a rearmost point K of the arm 56" and the height H is measured up to the height of the rearmost point K.

Figure 17:
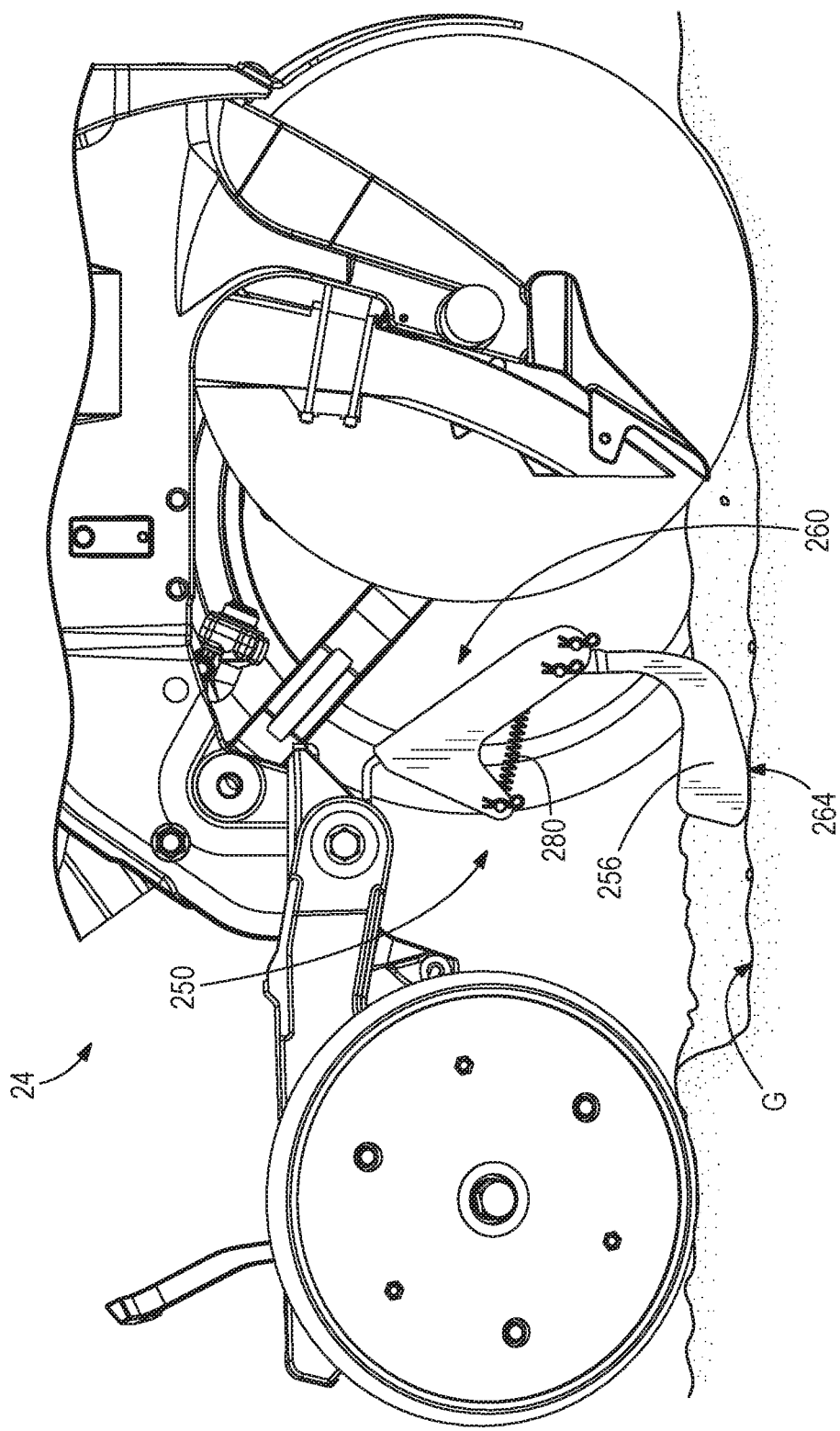
FIG. 17 is a side view of a row unit of the planter of FIG. 1, including a seed firmer according to yet another embodiment.
Figure 18:
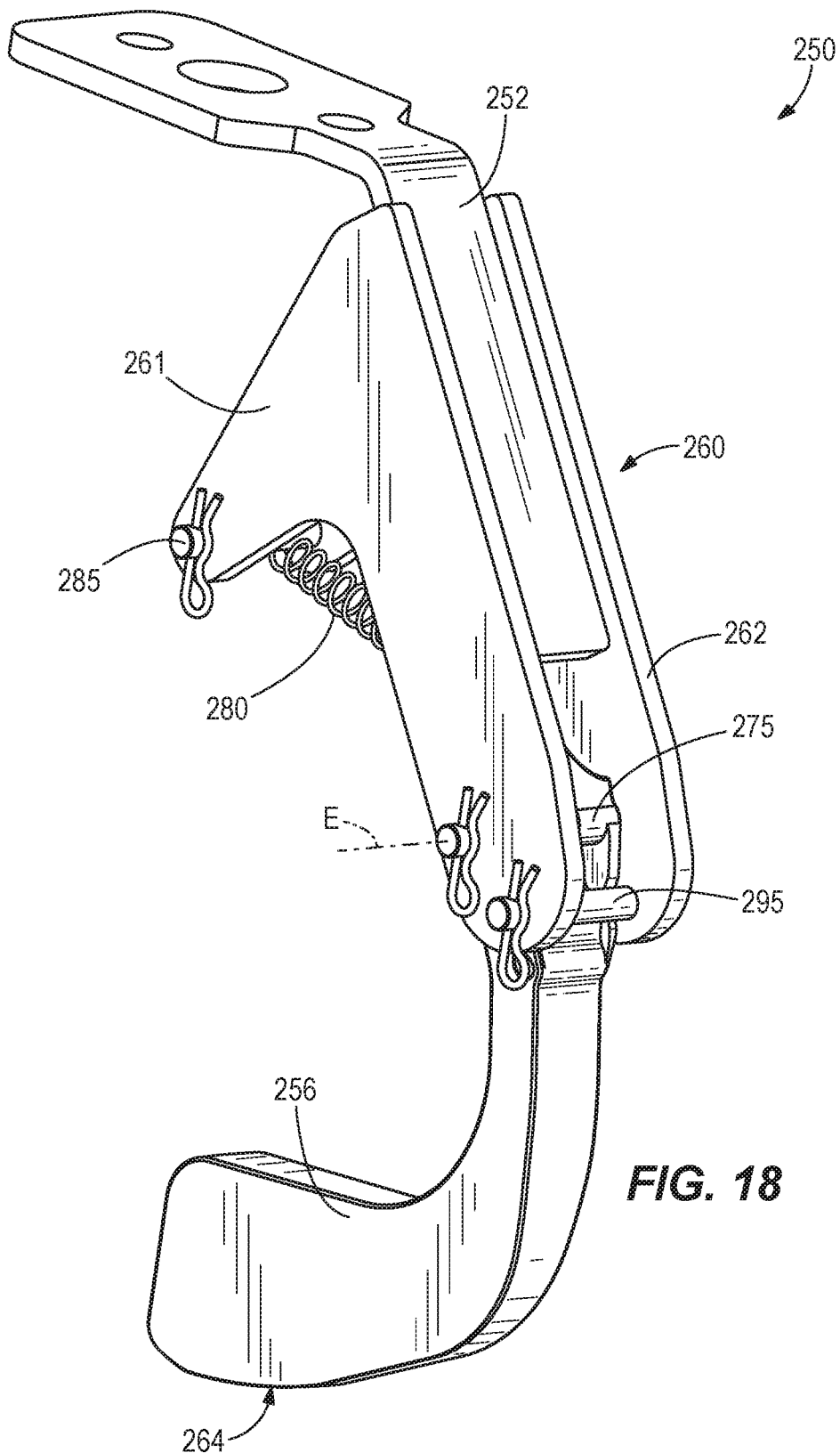
FIG. 18 is a perspective view of the seed firmer of FIG. 17.
Figure 19:
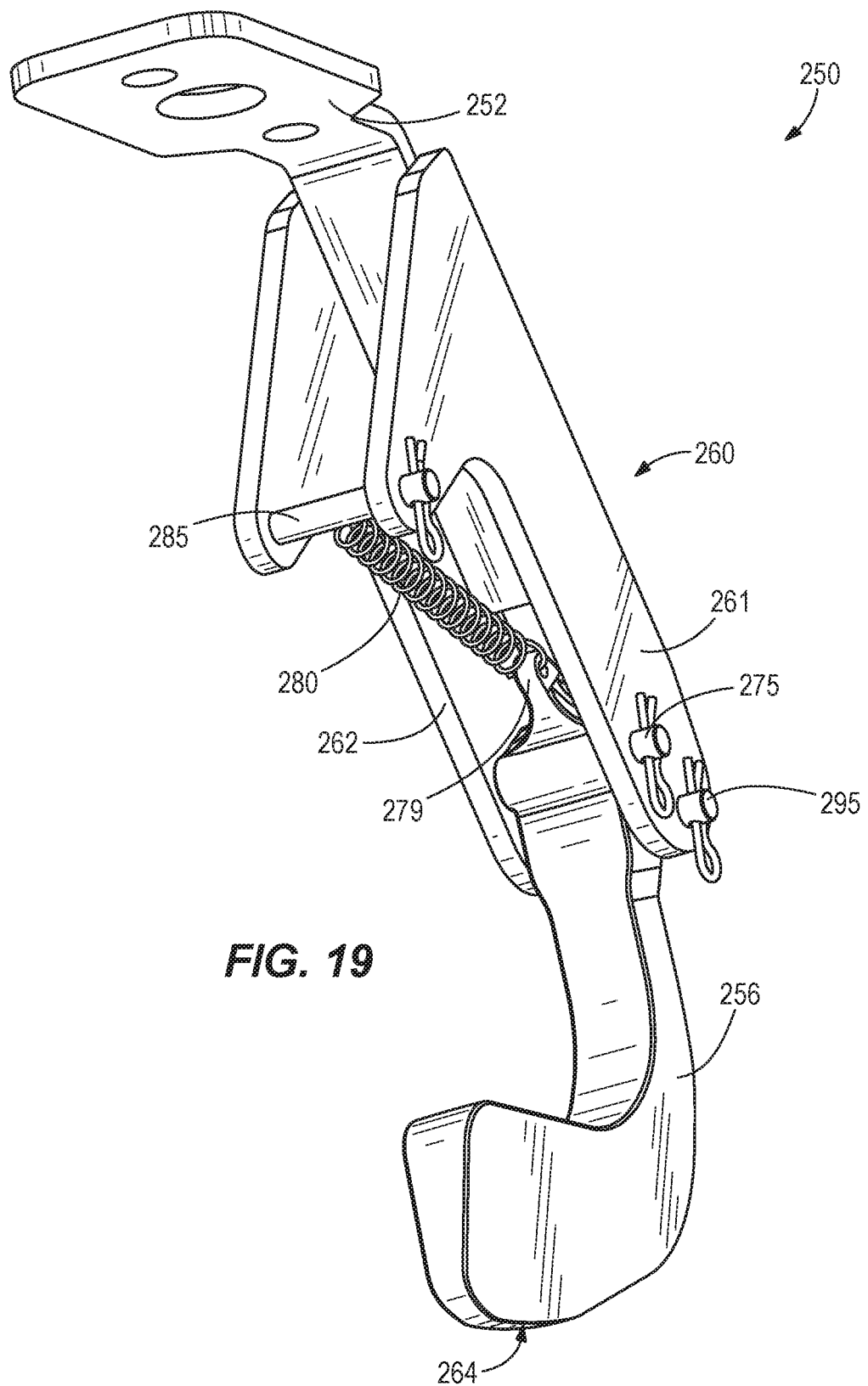
FIG. 19 is an alternate perspective view of the seed firmer of FIG. 17.

FIGS. 17-22 illustrate a seed firmer 250 according to another embodiment that can be used, for example, on any one or more of the row units 24 of the planting machine 20 shown in FIG. 1. One exemplary row unit 24 is illustrated in FIG. 17. As discussed in further detail below, the seed firmer 250 includes a rigid arm 256 that is pivotally-supported and spring-biased with respect to the row unit 24. The arm 256 provides a ground-facing surface 264 that can include any or all of the features discussed above with respect to the preceding embodiments. Contrary to the seed firmers and arms of FIGS. 2-16, the seed firmer 250 of FIGS. 17-22 is configured for supporting the arm 256 for single-axis pivoting movement, without multiple intermediate links. It is noted that the below description focuses primarily on aspects of the seed firmer 250 that differ with respect to the seed firmers of the preceding description, and aspects of the seed firmer 250 not specifically mentioned below can conform to features as described above, among others.

A mount 260 is coupled to an upper portion of the arm 256 for attaching the arm 256 to the row unit 24. The mount 260 can extend between the arm 256, which is coupled to a lower portion of the mount 260, and an attachment bracket 252, which is coupled to an upper portion of the mount 260. The attachment bracket 252, which can be integral with or separate from the mount 260, has a portion provided for attachment to the row unit 24. The mount 260 can support the arm 256 with a pivot connection defining a single axis E for rotation of the arm 256 relative to the mount 260. The mount 260 can be fixed in position with respect to the row unit 24 such that the arm 256 is pivotable relative to the row unit 24 about the axis E. The axis E can be fixed with respect to the arm 256 and with respect to the mount 260, without allowance for translational movement, so that pure rotation of the arm 256 is provided. Thus, the orientation of the arm 256 with respect to the ground G necessarily changes throughout the travel range of the arm 256 as it pivots about the axis E, assuming that the orientation remains constant between the row unit 24 and the ground G.

The mount 260 can include two parallel, lateral side plates 261, 262 between which at least a portion of the arm 256 is received. In other constructions, the mount 260 can include a single plate or more than two plates, and the plate(s) can be provided in alternate arrangements from that shown. The pivot connection providing the rotational axis E can be provided by a pin 275 that extends across the two side plates 261, 262 of the mount 260. Aside from minimal clearance provided in respective holes that receive the pin 275 to enable assembly, the pin 275 is held in a fixed position along the mount 260 and also along the arm 256.

At an upper end of the arm 256 that is furthest from the ground-facing surface 264, or on a portion of the arm 256 that is opposite the ground-facing surface 264 with respect to the rotational axis E, the arm 256 includes an attachment structure, or spring anchor 279, that is attached to a spring 280. The spring 280 can be a coil spring as shown or another type of elastic biasing member operable to bias the arm 256 (counter-clockwise in FIG. 17) so that the ground-facing surface 264 is urged into contact with the ground G. The spring 280 is further coupled to a positionally-fixed structure of the mount 260, for example a pin 285 supported by the two side plates 261, 262. As shown, the pin 285 provides a fixed rear mount for a rear end of the spring 280, while a front end of the spring 280 is secured to the spring anchor 279 on the arm 256. The spring 280 can alternately be coupled between the arm 256 and one of the attachment bracket 252 or the row unit 24.

Figure 20:
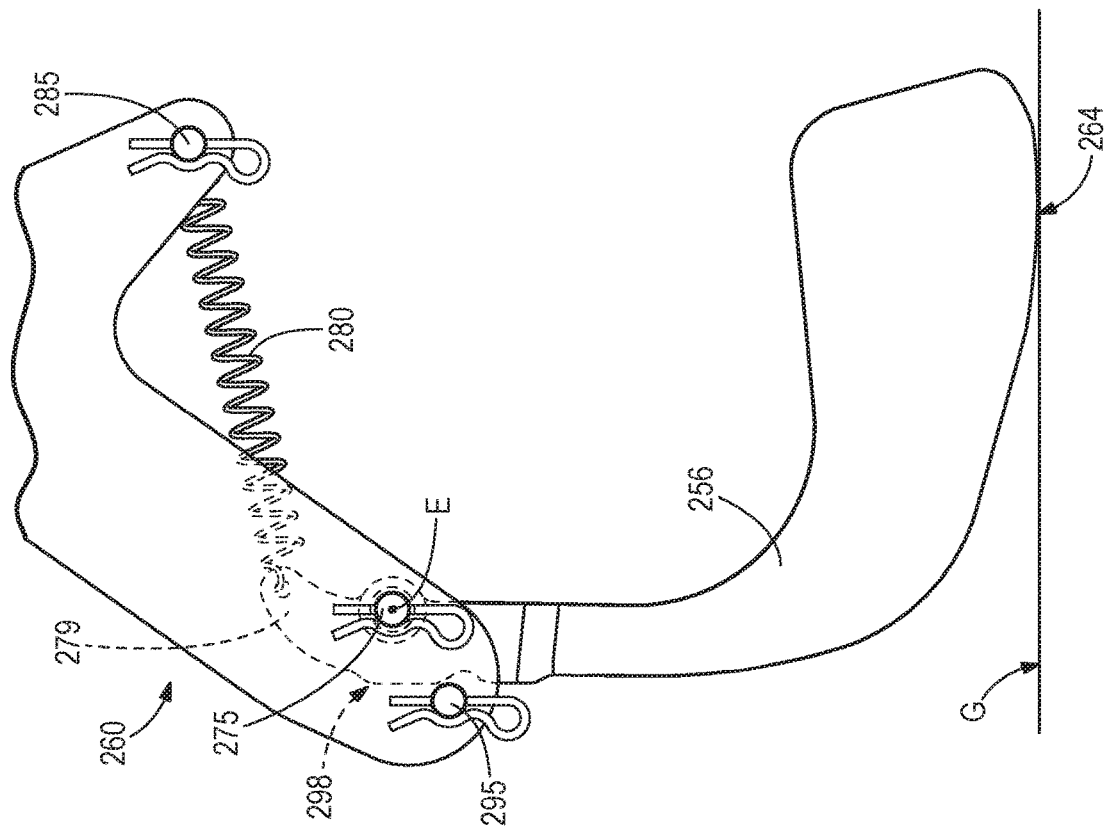
FIG. 20 is a side view of the seed firmer of FIG. 17 in a lower limit position.
Figure 21:
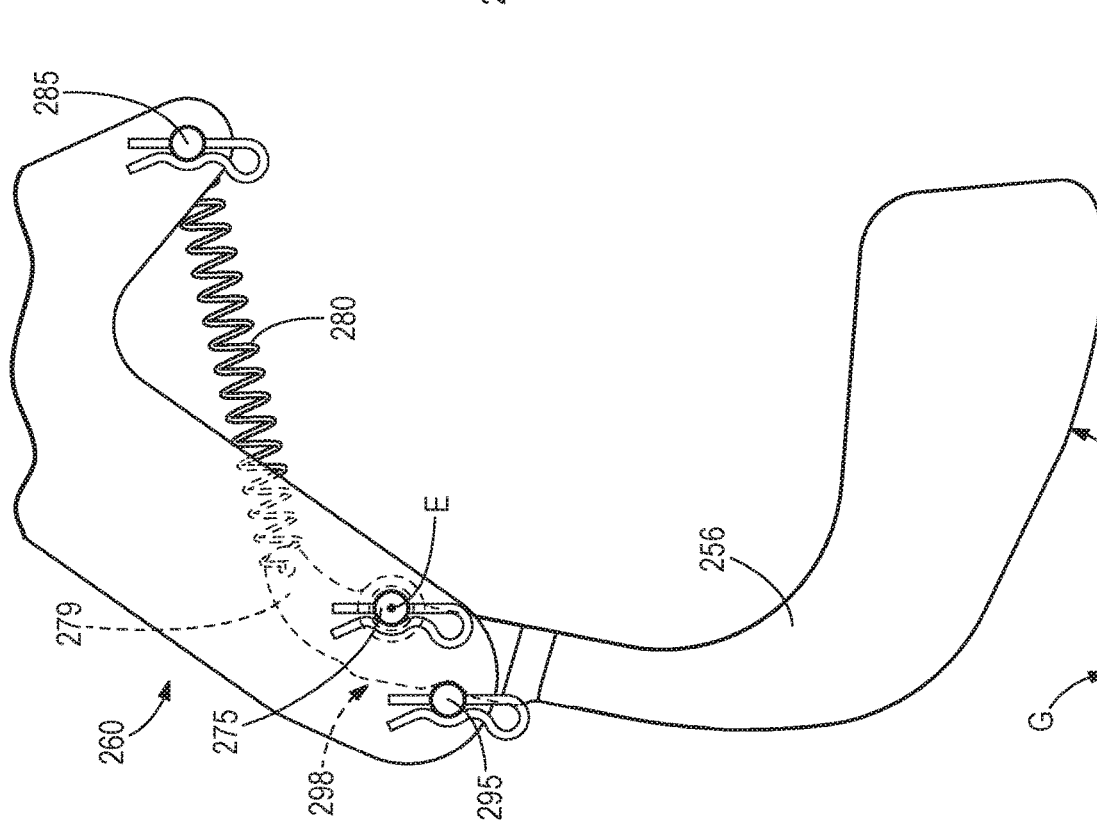
FIG. 21 is a side view of the seed firmer of FIG. 17 in a normal running position.
Figure 22:
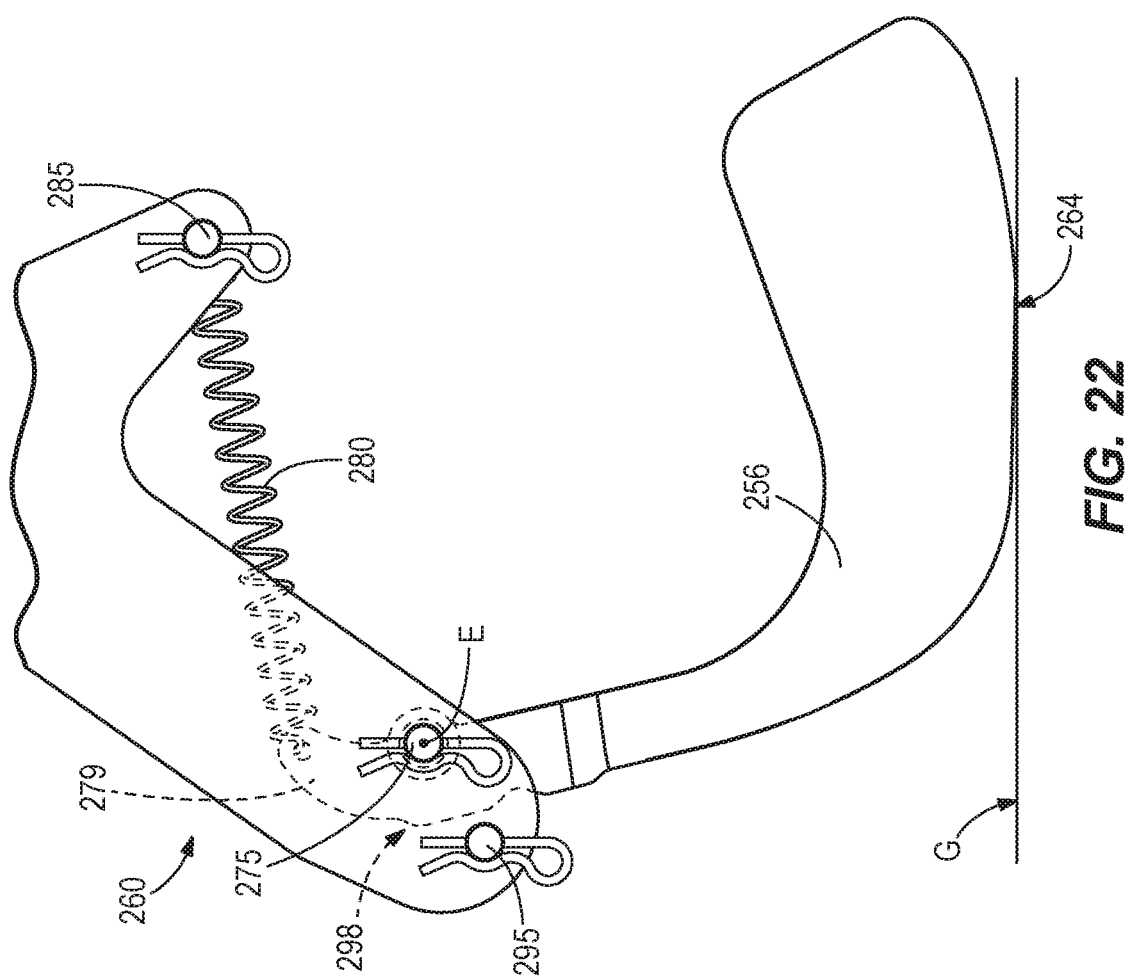
FIG. 22 is a side view of the seed firmer of FIG. 17 in an upwardly-pivoted position.

With no force applied to the arm 256 from the ground G, the spring 280 biases the arm to the position of FIG. 20. As shown here, the spring 280 urges the arm 256 in a clockwise direction about the axis E. The spring 280 can be held in tension throughout an entire range of motion of the arm 256, and the range of motion of the arm 256 can be limited at one end by an abutment surface of the mount 260, provided in the illustrated construction by a pivot stop in the form of yet another pin 295. The pin 295 can limit the travel of the arm 256 in one or both directions by contacting a leading or forward-facing surface 298 (FIGS. 20-22) of the arm 256. The abutment surface of the pin 295 can contact at the upper end of the arm 256 adjacent the spring anchor 279. The forward-facing surface 298 can be contoured to define the specific limit(s) of travel of the arm 256. The pin 295 that provides the abutment surface can be parallel to and spaced from each of the pin 275 that provides the pivot connection and the pin 285 that secures the spring 280.

The effect of the seed firmer arm mounting arrangement as shown in FIGS. 17-22 is that the seed firmer arm 256 (i.e., the ground-facing surface 264 thereof) is biased generally downward toward the ground G, and allowed to pivot upward about the pivot axis E when the ground-facing surface 264 encounters a locally-high ground area during movement of the row unit 24 for planting. Flexure or compliance of the seed firmer arm 256 is not required to keep the seed firmer arm 256 biased into contact with the ground G, and the entire seed firmer arm 256 can be designed as a rigid member (i.e., "non-compliant") made of a single, continuous material, or a plurality of rigid structures coupled rigidly together. As such, the structure of the seed firmer arm 256 can be robust and simple as the elastic biasing feature is separately provided in the compliant mount 260 of the seed firmer 250, separate from the seed firmer arm 256. While the orientation of the seed firmer arm 256 with respect to the ground G is not maintained exactly constant during the single-point pivoting provided by the axis E, the ground-facing surface 264 provides the requisite seed firming action throughout a useful range of pivoting travel of the seed firmer arm 256. Thus, many of the advantages of the seed firmer of FIGS. 2-16 can be provided with a simplified construction that requires as little as a single biasing member (e.g., spring 280) and no intermediate links between the seed firmer arm 256 and the bracket 252. The plates 261, 262, along with the bracket 252, provide a single, unitary base member of the seed firmer 250, about which the arm 256 is pivotally supported with compliance.

What is claimed is:

1. A seed firmer for a planting machine, the seed firmer comprising:
   an attachment bracket having a portion provided for attachment to a row unit of the planting machine;
   a non-compliant arm provided with a ground-facing surface for engagement with the soil during planting; and
   a mount through which the non-compliant arm is connected to the attachment bracket,
   wherein the mount is a compliant mount operable to deflect and exert an elastic bias force during operation, without deflection of the non-compliant arm,
   wherein the mount is provided by a linkage comprising a first link having a first end pivotally coupled to the attachment bracket and a second end pivotally coupled to the non-compliant arm, and a second link having a first end pivotally coupled to the attachment bracket and having a second end pivotally coupled to the non-compliant arm, and
   wherein the first and second links are normally biased to have a parallel relationship, and wherein one of the first and second links includes a selective sliding joint operable to enable the linkage to be selectively tripped to transition from the parallel relationship to a non-parallel relationship.

2. The seed firmer of claim 1, wherein the mount includes a spring.

3. The seed firmer of claim 1, wherein, when in the parallel relationship, the first link and the second link, along with the non-compliant arm and a base link fixed with respect to the attachment bracket, form a parallel linkage so that the non-compliant arm is movable relative to the attachment bracket without changing orientation.

4. The seed firmer of claim 1, wherein the elastic bias force is provided by a spring, the seed firmer further comprising a second spring operable to bias the selective sliding joint into a position that maintains the parallel relationship between the first and second links.

5. A seed firmer for a planting machine, the seed firmer comprising:
   an attachment bracket having a portion provided for attachment to a row unit of the planting machine;
   a non-compliant arm provided with a ground-facing surface for engagement with the soil during planting; and
   a mount through which the non-compliant arm is connected to the attachment bracket,
   wherein the mount is a compliant mount operable to deflect and exert an elastic bias force during operation, without deflection of the non-compliant arm,
   wherein the elastic bias force is provided by a spring held in tension throughout an entire range of motion of the non-compliant arm, the range of motion of the non-compliant arm being limited by an abutment surface of the mount,
   the seed firmer further comprising a pivot connection between the non-compliant arm and the mount, wherein the abutment surface and the pivot connection are provided by parallel, spaced pins extending between lateral side plates of the mount that flank the non-compliant arm.

6. A seed firmer for a planting machine, the seed firmer comprising:
   an attachment bracket having a portion provided for attachment to a row unit of the planting machine;
   a non-compliant arm provided with a ground-facing surface for engagement with the soil during planting;
   a mount through which the non-compliant arm is connected to the attachment bracket,
   wherein the mount is a compliant mount operable to deflect and exert an elastic bias force during operation, without deflection of the non-compliant arm; and
   a pivot connection between the non-compliant arm and the mount, wherein the pivot connection defines an axis for the relative rotation between the non-compliant arm and the mount that is fixed relative to the non-compliant arm and the mount, and wherein the pivot connection is positioned along the non-compliant arm at a location between the ground-facing surface and a portion of the non-compliant arm to which a spring providing the elastic bias force is attached.

7. A planting machine comprising:
   a plurality of row units, each row unit having a furrow opener, furrow closing wheels behind the opener, a seed dispensing cartridge between the opener and the closing wheels, and a seed firmer coupled to the row unit behind the cartridge and forward of the closing wheels,
   wherein the seed firmer in each of the plurality of row units has a non-compliant arm and a compliant mount coupling the arm to the row unit, and
   wherein the compliant mount is provided by a linkage comprising a first link having a first end pivotally coupled to an attachment bracket of the seed firmer and a second end pivotally coupled to the non-compliant arm, and a second link having a first end pivotally coupled to the attachment bracket and having a second end pivotally coupled to the non-compliant arm.

8. The planting machine of claim 7, wherein the compliant mount includes a spring.

9. The planting machine of claim 7, wherein the first link and the second link, along with the non-compliant arm and a base link fixed with respect to the attachment bracket, form a parallel linkage so that the non-compliant arm is movable relative to the attachment bracket without changing orientation.

10. The planting machine of claim 7, wherein the first and second links are normally biased to have a parallel relationship, and wherein one of the first and second links includes a selective sliding joint operable to enable the linkage to be selectively tripped to transition from the parallel relationship to a non-parallel relationship.

11. The planting machine of claim 10, wherein the compliant mount includes a first spring operable to bias the non-compliant arm groundward, wherein the seed firmer further includes a second spring operable to bias the selective sliding joint into a position that maintains the parallel relationship between the first and second links.

12. A planting machine comprising:
a plurality of row units, each row unit having a furrow opener, furrow closing wheels behind the opener, a seed dispensing cartridge between the opener and the closing wheels, and a seed firmer coupled to the row unit behind the cartridge and forward of the closing wheels
wherein the seed firmer in each of the plurality of row units has a non-compliant arm and a compliant mount coupling the arm to the row unit, and
wherein the seed firmer includes a spring held in tension throughout an entire range of motion of the non-compliant arm, the range of motion of the non-compliant arm being limited by an abutment surface of the compliant mount.

13. The planting machine of claim 12, further comprising a pivot connection between the non-compliant arm and the compliant mount, wherein the abutment surface and the pivot connection are provided by parallel, spaced pins extending between lateral side plates of the compliant mount that flank the non-compliant arm.

14. A planting machine comprising:
a plurality of row units, each row unit having a furrow opener, furrow closing wheels behind the opener, a seed dispensing cartridge between the opener and the closing wheels, and a seed firmer coupled to the row unit behind the cartridge and forward of the closing wheels,
wherein the seed firmer in each of the plurality of row units has a non-compliant arm, a compliant mount coupling the arm to the row unit, and a pivot connection between the non-compliant arm and the compliant mount.

15. The planting machine of claim 14, wherein the pivot connection defines an axis for the relative rotation between the non-compliant arm and the compliant mount that is fixed relative to the non-compliant arm and the compliant mount, and wherein the pivot connection is positioned along the non-compliant arm at a location between the ground-facing surface and a portion of the non-compliant arm to which a spring that biases the non-compliant arm groundward is attached.

* * * * *